(12) United States Patent
Nash et al.

(10) Patent No.: US 11,613,332 B2
(45) Date of Patent: Mar. 28, 2023

(54) GYROSCOPIC STABILIZER

(71) Applicant: Kinetrol Limited, Surrey (GB)

(72) Inventors: George Nash, Surrey (GB); John Nash, Surrey (GB)

(73) Assignee: KINETROL LIMITED, Surrey (GB)

( * ) Notice: Subject to any disclaimer, the term of this patent is extended or adjusted under 35 U.S.C. 154(b) by 143 days.

(21) Appl. No.: 17/328,369

(22) Filed: May 24, 2021

(65) Prior Publication Data

US 2021/0371058 A1 Dec. 2, 2021

(30) Foreign Application Priority Data

May 26, 2020 (GB) ...................................... 2007790

(51) Int. Cl.
*B63B 39/04* (2006.01)
*F16F 15/167* (2006.01)

(52) U.S. Cl.
CPC ............ *B63B 39/04* (2013.01); *F16F 15/167* (2013.01)

(58) Field of Classification Search
CPC ........ B63B 39/04; F16F 15/167; G01C 19/02; G01C 19/04; G01C 19/06; G01C 19/08; G01C 19/16; G01C 19/18; G01C 19/22
See application file for complete search history.

(56) References Cited

U.S. PATENT DOCUMENTS

| 9,586,660 B2 | 3/2017 | Ulgen |
| 2016/0347429 A1* | 12/2016 | Ulgen ................... B63B 39/04 |
| 2017/0043847 A1 | 2/2017 | Ulgen |
| 2017/0370443 A1 | 12/2017 | Nohara et al. |

FOREIGN PATENT DOCUMENTS

| FR | 811699 | 4/1937 | |
| JP | 2017019315 A | * 1/2017 | ........... B63B 39/005 |
| KR | 20100082565 | 7/2010 | |
| WO | WO 2009/049371 | 4/2009 | |

OTHER PUBLICATIONS

GB Search Report for GB2007790.5 dated Feb. 18, 2021.
Extended European Search Report for EP 21 17 6024 dated Nov. 5, 2021.

* cited by examiner

*Primary Examiner* — Daniel D Yabut
(74) *Attorney, Agent, or Firm* — Stephen J. Weyer, Esq.; Stites & Harbison, PLLC

(57) ABSTRACT

A gyroscopic stabiliser for stabilising motion of an object, the gyroscopic stabiliser comprising: a support for attaching to the object whose motion is to be stabilised; a gimbal rotatably supported by the support to be rotatable around a first axis relative to the support; and a flywheel rotatably supported by the gimbal to be rotatable around a second axis relative to the gimbal, the second axis being orthogonal to the first axis; wherein the gimbal is rotatably supported by the support at least partly within a maximum width of the gimbal along the first axis; and a maximum width of the gyroscopic stabiliser along the first axis is equal to, or substantially equal to, the maximum width of the gimbal along the first axis.

31 Claims, 21 Drawing Sheets

PRIOR ART

GYROSCOPIC STABILIZER

FIELD OF THE INVENTION

The present invention relates to a gyroscopic stabiliser for stabilising motion of an object, for example rolling or pitching motion of a marine vessel.

BACKGROUND OF THE INVENTION

Rolling motion of a marine vessel corresponds to rotation of the marine vessel around a longitudinal axis (front-to-back axis, or fore to aft axis) of the marine vessel. In other words, rolling motion of a marine vessel corresponds to side-to-side rotation of the marine vessel.

Pitching motion of a marine vessel corresponds to rotation of the marine vessel around a transverse axis (side-to-side axis, or port to starboard axis) of the marine vessel. In other words, pitching motion of a marine vessel corresponds to front-to-back rotation of the marine vessel.

Rolling and pitching motion of a marine vessel are generally caused by the interaction of the marine vessel with waves. Rolling or pitching motion of a marine vessel can cause sea sickness in passengers of the marine vessel, and therefore is generally undesirable.

It is known to provide a marine vessel with a gyroscopic stabiliser to stabilise rolling or pitching motion of the marine vessel. Such a gyroscopic stabiliser is known from US2017/0370443A1, for example, which is incorporated herein by reference.

A schematic illustration of a typical gyroscopic stabiliser, similar to the gyroscopic stabiliser disclosed in US2017/0370443A1, is illustrated in FIG. 1.

As shown in FIG. 1, the typical gyroscopic stabiliser 1 comprises a frame 3 that can be attached to a marine vessel (not shown). A gimbal 5 is rotatably mounted within the frame 3 so as to be rotatable around a first axis A (a horizontal axis in FIG. 1) relative to the frame 3. Specifically, the gimbal 5 has two horizontal shafts 7 extending from opposite sides of the gimbal 5 along the first axis A. These shafts 7 are rotatably mounted in the frame 3 via first bearings 9 between the frame 3 and the shafts 7, such that the gimbal 5 can be rotated around the first axis A relative to the frame 3. This arrangement means that the gimbal 5 can only be rotated around the first axis A relative to the frame 3, i.e. the gimbal 5 cannot rotate around any other axis relative to the frame 3.

A flywheel 11 and flywheel shaft 13 are rotatably mounted inside the gimbal 5 via second bearings 15 between the gimbal 5 and the ends of the flywheel shaft 13, such that the flywheel 11 and flywheel shaft 13 are rotatable around a second axis B (a vertical axis in FIG. 1) relative to the gimbal 5. The second axis B is the longitudinal axis of the flywheel shaft 13 and is orthogonal to the first axis A.

An electric motor (not illustrated) is included in the gyroscopic stabiliser to drive the flywheel 11 and flywheel shaft 13 to rotate around the second axis B.

In use, the gyroscopic stabiliser is attached to a marine vessel with the first axis A aligned with the direction in which the marine vessel experiences the rolling or pitching motion that is to be reduced.

For example, when it is desired to reduce side-to-side (port to starboard) rolling of the marine vessel, the gyroscopic stabiliser is attached to the marine vessel with the first axis A aligned with the transverse direction (side-to-side direction or port to starboard direction) of the marine vessel.

When the flywheel 11 is caused to rotate by the motor, it has an angular momentum L given in equation (1) below, where I is the moment of inertia of the flywheel 11 and $\omega$ is the angular velocity of the flywheel 11:

$$L = I\omega \qquad (1)$$

When the marine vessel experiences a rolling motion along the direction of the first axis A, for example due to a rolling torque applied to the marine vessel by waves, the marine vessel and therefore the gyroscopic stabiliser 1 experience an angular velocity $\varphi$ around a third axis C orthogonal to the first axis A (out of the page in FIG. 1). Specifically, when the first axis A is aligned with the transverse direction (side-to-side direction or port to starboard direction) of the marine vessel, the third axis C corresponds to the longitudinal direction (front-to-back direction or fore to aft direction) of the marine vessel.

Well-known gyroscopic effects mean that the rolling of the marine vessel along the direction of the first axis A, combined with the angular momentum of the flywheel 11 due to it spinning around the second axis B, causes the gimbal 5 to precess (oscillate) around the first axis A with a precession rate $\psi$ and angle $\theta$. The precession rate $\psi$ depends on the roll rate of the marine vessel along the direction of the first axis A.

Well known gyroscopic effects mean that the precession (oscillation) of the gimbal 5 around the first axis A causes a stabilising torque around the third axis C that opposes the rolling motion of the marine vessel. In other words, the stabilising torque acts in an opposite direction to the rolling torque that is causing the rolling motion. The rolling motion of the marine vessel is therefore partially suppressed, because at least some of the rolling torque is cancelled out by the stabilising torque, such that the resultant torque acting on the marine vessel is significantly reduced.

In this manner, the gyroscopic stabiliser 1 acts to reduce the rolling motion of the marine vessel along the direction of the first axis A.

As shown in FIG. 1, the gyroscopic stabiliser 1 further includes two dampers 17 that are coupled to each of the horizontal shafts 7, and which are located on the outside of the frame 3. The dampers 17 act to damp the precession rate $\psi$ of the gimbal 5 relative to the frame 3. In particular, the dampers 17 give a resistance to the relative motion between the frame 3 and the gimbal 5, to reduce the precession rate $\psi$ of the gimbal 5 relative to the frame 3.

The magnitude T of the stabilising torque generated by the gyroscopic stabiliser 1 is given by equation (2):

$$T = L\psi \cos(\theta) \qquad (2)$$

Therefore, by controlling the precession rate $\psi$ of the gimbal 5 relative to the frame 3, the dampers 17 control the magnitude T of the stabilising torque. In particular, by providing the dampers 17, it is possible to prevent excessive stabilisation torques from being generated by the gyroscopic stabiliser 1.

Furthermore, if the precession angle $\theta$ becomes more than 90°, the gyro motion becomes unstable and can lead to increasing rolling motion rather than reducing the rolling motion. This can be prevented by providing the dampers 17, which can damp the precession such that the precession angle $\theta$ does not become more than 90°.

The purpose of the dampers is therefore both to control the amount of stabilising torque that the gyro delivers and to prevent the gyro from turning into a roll amplifying device.

In US2017/0370443A1, the dampers 17 are passive dampers that are configured so that a damping coefficient of the damper 17 increases according to the increase in the relative rotation velocity between the frame 3 and the gimbal 5, such that the resistance to relative motion between the frame 3 and the gimbal 5 provided by the dampers 17 increases with increasing precession rate $\psi$. This can be advantageous because for a low relative rotation velocity between the frame 3 and the gimbal 5, i.e. a small amount of rolling of the marine vehicle, there is minimal damping, and the stabilising torque can be maximised so as to effectively cancel out the small amount of rolling. In contrast, when the relative rotation velocity between the frame 3 and the gimbal 5 is high, i.e. a large amount of rolling, there is a greater amount of damping, and excessive stabilising torques can be prevented.

SUMMARY OF THE INVENTION

As can be seen from equations (1) and (2) above, the magnitude of the stabilising torque generated by a gyroscopic stabiliser is proportional to the moment of inertia I of the flywheel of the gyroscopic stabiliser.

The moment of inertia of the flywheel of the gyroscopic stabiliser, and therefore the stabilising torque, can be increased by increasing the diameter of the flywheel.

However, the available space for the gyroscopic stabiliser in a marine vessel or other vehicle is typically constrained, and therefore there is a limit on the maximum possible size of the gyroscopic stabiliser.

In arriving at the present invention, the present inventors have realised that the conventional gyroscopic stabiliser can be adapted to maximise the magnitude of the stabilising torque generated by a gyroscopic stabiliser for a given size of the gyroscopic stabiliser.

In particular, the present inventors have realised that if the outer envelope of the gyroscopic stabiliser is substantially defined by the outer envelope of the gimbal, the size of the gimbal and therefore the flywheel in the gimbal can be maximised for a given size of the gyroscopic stabiliser.

The present inventors have realised that this can be achieved by rotatably supporting the gimbal at least partly within a maximum width of the gimbal along the first axis (precession axis) of the gyroscopic stabiliser, such that it is not necessary to provide pivoting means such as shafts and bearings for the gimbal entirely outside of the maximum width of the gimbal along the first axis. Instead, the maximum width of the gyroscopic stabiliser along the first axis can be substantially determined by the maximum width of the gimbal that contains the flywheel along the first axis.

At its most general, the present invention therefore relates to a gyroscopic stabiliser in which a gimbal containing a flywheel is rotatably supported at least partly within a maximum width of the gimbal along the first axis (precession axis) of the gyroscopic stabiliser.

According to the present invention, there is provided a gyroscopic stabiliser for stabilising motion of an object, the gyroscopic stabiliser comprising: a support for attaching to the object whose motion is to be stabilised; a gimbal rotatably supported by the support to be rotatable around a first axis relative to the support; and a flywheel rotatably supported by the gimbal to be rotatable around a second axis relative to the gimbal, the second axis being orthogonal to the first axis; wherein the gimbal is rotatably supported by the support at least partly within a maximum width of the gimbal along the first axis.

In the gyroscopic stabiliser according to present invention, the gimbal is rotatably supported by the support at least partly within a maximum width of the gimbal along the first axis. Therefore, it is not necessary to provide components for rotatably supporting the gimbal entirely outside of the maximum width of the gimbal along the first axis. This means that for a given size of the gyroscopic stabiliser, the size of the gimbal, and therefore the diameter of the flywheel, along the first axis can be maximised, and therefore the magnitude of the stabilising torque generated by the gyroscopic stabiliser can be maximised for a given size of the gyroscopic stabiliser along the first axis.

In particular, with the present invention, an outer envelope of the gyroscopic stabiliser can be defined by an outer envelope of the gimbal that contains the flywheel.

The gyroscopic stabiliser according to the present invention may have any one, or, where compatible, any combination of the following optional features.

Stabilising motion of the object may mean reducing some or all of a motion of the object, for example some or all of a particular component of the motion of the object. For example, stabilising motion of the object may mean reducing oscillation of the object, such as pitching or rolling motion of the object.

The object may be any object that experiences unwanted motion, such as unwanted oscillation. For example, the object may be a vehicle such as a marine vehicle.

A support means any part that is suitable for being attached to an object whose motion is to be stabilised, and for rotatably supporting the gimbal. The support may comprise means for fixing the support to the object, such as one or more holes for receiving fastenings. Alternatively, fastening may be achieved using a separate fastening component, such as a bracket.

The support may be in the form of a frame or cage or housing or shell.

At its most general, a gimbal may be a pivoted support, that is pivoted relative to the support and that can rotatably support the flywheel.

The gimbal is rotatably supported by the support so as to be only rotatable around the first axis relative to the support. In other words, the gimbal cannot be rotated around any other axes relative to the support. The gimbal is therefore constrained to only be able to rotate around the first axis relative to the support. For example, this may be achieved by pivoting the gimbal relative to the support at two pivot points on opposite sides of the gimbal.

The flywheel is rotatably supported by the gimbal so as to be only rotatable around the second axis relative to the gimbal. In other words, the flywheel cannot be rotated around any other axes relative to the gimbal. The flywheel is therefore constrained to only be able to rotate around the second axis relative to the gimbal. For example, this may be achieved by pivoting the flywheel relative to the gimbal at two pivot points on opposite sides of the flywheel (above and below the flywheel).

The gimbal being rotatably supported by the support at least partly within a maximum width of the gimbal along the first axis means that when the gyroscopic stabiliser is viewed perpendicular to the first axis (for example along the second axis), a position (or positions) along the first axis at which the gimbal is rotatably supported by the support is (are) at least partly within (for example inside or between) the maximum extremities of the gimbal along the first axis (i.e. at least partly inside an outer perimeter of the gimbal along the first axis).

Put another way, the gimbal being rotatably supported by the support at least partly within a maximum width of the gimbal along the first axis means that when the gyroscopic stabiliser is viewed perpendicular to the first axis (for example along the second axis), a position (or positions) along the first axis at which the gimbal is rotatably supported by the support at least partly overlap with an area between the maximum extremities of the gimbal along the first axis (i.e. at least partly overlap with an area inside an outer perimeter of the gimbal along the first axis).

Within the maximum width of the gimbal along the first axis may mean inside of the maximum width of the gimbal along the first axis, or between the outer edges of the gimbal along the first axis, or overlapping with the extent of the gimbal along the first axis.

Put another way, along the first axis, the position or positions at which the gimbal is rotatably supported by the support are between the outermost edges of the gimbal along the first axis.

The term "at least partly" means entirely or fully, i.e. 100%, or partly, i.e. less than 100%. In other words, a position (or positions) along the first axis at which the gimbal is rotatably supported by the support may be entirely within the perimeter of the gimbal, or may overlap the perimeter such that part of the position is inside of the perimeter and part of the position is outside of the perimeter.

In the above, references to "the gimbal", "maximum width of the gimbal", "outer edges of the gimbal", "maximum extremities of the gimbal", etc, may refer to a main body part of the gimbal.

The maximum width of the gimbal may therefore mean a maximum width of a main body part of the gimbal.

The main body part of the gimbal may be a casing or shell or housing or cage part of the gimbal, for example.

The maximum width of the gimbal may therefore mean a maximum width of a casing or shell or housing or cage part of the gimbal.

The maximum width of the gimbal may mean a maximum width of a part of the gimbal that directly surrounds or encloses or houses the flywheel.

The maximum width of the gimbal may exclude any components attached to the main body part of the gimbal, for example any shafts or connectors.

Preferably, the maximum width of the gimbal is limited to the diameter of the flywheel plus a minimal protrusion necessary to enclose the flywheel.

For example, the maximum width of the gimbal may be within 15%, or 10%, or 5%, or 1% of the diameter of the flywheel.

A shape of the gimbal where the gimbal encloses the flywheel may substantially correspond to, or substantially match, the shape of the flywheel.

An inner surface of the gimbal where the gimbal encloses the flywheel may substantially correspond to, or substantially match, an outer surface of the flywheel.

An outer surface of the gimbal where the gimbal encloses the flywheel may substantially correspond to, or substantially match, an outer surface of the flywheel.

The gimbal may be rotatably supported by the support entirely within the maximum width of the gimbal along the first axis.

Maximum width of the gimbal may mean a maximum width of a main body of the gimbal.

The gimbal may be rotatably supported by the support at two positions on opposite sides of the gimbal; and each the two positions may be at least partly (partly or entirely) within the maximum width of the gimbal along the first axis.

A maximum width of the gyroscopic stabiliser along the first axis may be equal to, or substantially equal to, the maximum width of the gimbal along the first axis. For example, the maximum width of the gyroscopic stabiliser along the first axis may be within 15%, or 10%, or within 5%, or within 1% of the maximum width of the gimbal along the first axis.

A maximum width of the gyroscopic stabiliser along the first axis may be within 15%, or 10%, or within 5%, or within 1% of the diameter of the flywheel.

The gimbal may protrude into an opening in the support along the first axis. The gimbal may protrude into two openings in the support on opposite sides of the gimbal along the first axis.

A maximum width of the gyroscopic stabiliser along a third axis that is orthogonal to the first axis may be equal to, or substantially equal to, a width of the gimbal along the third axis. For example, the width of the gyroscopic stabiliser along the third axis may be within 10%, or within 5%, or within 1% of the width of the gimbal along the third axis.

A maximum width of the gyroscopic stabiliser along the third axis may be within 15%, or 10%, or within 5%, or within 1% of the diameter of the flywheel.

The gimbal may protrude into an opening in the support along the third axis. The gimbal may protrude into two openings in the support on opposite sides of the gimbal along the third axis.

The support may comprise first and second support parts on opposite sides of the gimbal along the first axis.

The first and second support parts may be connected by one or more connecting parts. For example, the connecting parts may be struts, such as cylindrical struts.

The gimbal may be rotatably supported by the support at least partly within a diameter of the flywheel. In other words, when viewed perpendicular to the first axis, for example along the second axis, a position (or positions) along the first axis at which the gimbal is rotatably supported by the support may overlap with the flywheel.

The gimbal may be rotatably supported by the support by one or more bearings, and the one or more bearings may be at least partly within the maximum width of the gimbal along the first axis.

The flywheel may be connected to a flywheel shaft that rotates together with the flywheel. For example, the flywheel shaft may be fixed to a mid-point of the flywheel (when viewed along the second axis) and may extend perpendicularly to the flywheel along the second axis.

The gimbal may house, surround or enclose the flywheel.

The gimbal may be a casing, housing, shell or cage that encloses and/or surrounds the flywheel. The gimbal may also enclose and/or surround a flywheel shaft to which the flywheel is connected.

A width (for example minimum width) of the gimbal along the first axis where the gimbal encloses the flywheel shaft may be less than a width (for example minimum width) of the gimbal where the gimbal encloses the flywheel.

A width (for example minimum width) of the gimbal along the first axis where the gimbal encloses the flywheel shaft may be less than a diameter of the flywheel.

A width (for example minimum width) of the gimbal along the third axis where the gimbal encloses the flywheel shaft may be less than a width (for example minimum width) of the gimbal where the gimbal encloses the flywheel.

A width (for example minimum width) of the gimbal along the third axis where the gimbal encloses the flywheel shaft may be less than a diameter of the flywheel.

The gimbal may be substantially rotationally symmetric around the second axis.

A shape of the gimbal where the gimbal encloses the flywheel shaft may substantially correspond to, or substantially match, the shape of the flywheel shaft. Therefore, the gimbal may be substantially cylindrical in shape around the flywheel shaft.

A shape of the gimbal may substantially corresponds to, or substantially match, a combined shape of the flywheel and the flywheel shaft.

An outer shape of the gimbal where the gimbal houses the flywheel may be substantially hemispherical.

The gimbal may be rotatably supported by the support by one of more rotary connections between the gimbal and support, the one or more rotary connections being within the maximum width of the gimbal along the first axis.

The support may comprise a support portion that extends inwards from an outer portion of the support to rotatably support the gimbal within the maximum width of the gimbal along the first axis, for example inside of the diameter of the flywheel.

For example, the outer portion of the support may be located at, or adjacent to, or overlapping, a perimeter of the gimbal, and the support portion may extend inwards into the gyroscopic stabiliser to a position within the maximum width of the gimbal along the first axis, for example inside of the diameter of the flywheel.

The gimbal may be pivotally mounted to the support portion within the maximum width of the gimbal along the first axis. In particular, the gimbal may be pivotally mounted to the support portion so that the gimbal is constrained to only be able to rotate around the first axis relative to the support portion.

The support portion may comprise two support arms that extend inwards from outer portions of the support on opposite sides of the gimbal to rotatably support the gimbal within the maximum width of the gimbal along the first axis.

The support portion may extend inwards from the outer portion of the support to rotably support the gimbal where the gimbal encloses the flywheel shaft.

The support arms may be integral with the outer portions of the support, or may be fixed to the outer portions of the support.

In particular, the support may comprise first and second support parts on opposite sides of the gimbal along the first axis, and the support arms may extend inwards from the first and second support parts to rotatably support the gimbal within the maximum width of the gimbal along the first axis.

The gimbal may be rotatably supported by the support with one or more bearings, and the one or more bearings are located at least partly within the maximum width of the gimbal along the first axis.

The gimbal may be rotatably supported by the support at one or more shafts that extend from the gimbal, and the one or more shafts are located within the maximum width of the gimbal along the first axis.

The gimbal may be rotatably supported at two pivot points on opposite sides of the gimbal and within the maximum width of the gimbal along the first axis.

The gimbal may be rotatably supported by the support at two pivot points on opposite sides of the flywheel shaft.

For example, the two support arms may be pivoted to the gimbal on opposite sides of the flywheel shaft, so that the gimbal can be rotated relative to the support arms around the first axis.

A surface of the flywheel may have a non-planar shape, and the gimbal may be rotatably supported by the support inside a space enclosed by the surface of the flywheel. For example, some or part of an upper surface of the flywheel may be curved upwards or angled upwards on going radially outwards form a centre of the flywheel, so that the upper surface of the flywheel encloses a space (from below).

The flywheel may be radially symmetric.

A surface of the flywheel may be substantially cup-shaped or U-shaped, and the gimbal may be rotatably supported by the support inside a space enclosed by the surface of the flywheel.

The gimbal may be rotatably supported by the support by bearings positioned between the gimbal and the support. The bearings may be directly between the gimbal and the support or indirectly between the gimbal and the support, for example via an additional part.

The bearings may be ring-shaped bearings that surround parts of the gimbal. In other words, the ring shaped bearings may have central openings, and parts of the gimbal may protrude into the central openings.

The bearings may be slewing rings.

The support may comprise side portions at least partly within the maximum width of the gimbal along the first axis, and the side portions may have openings into which the gimbal protrudes along the first axis. For example, the side portions may be side walls or side supports. The support may be attached to the object whose motion is to be stabilised via the side portions.

The bearings may be positioned in the openings in the side portions, and the parts of the gimbal may protrude into the openings.

The gyroscopic stabiliser may comprise a damping mechanism for damping rotation of the gimbal relative to the support, the damping mechanism being within the maximum width of the gimbal along the first axis. Damping rotation of the gimbal relative to the support may mean resisting or reducing rotation of the gimbal relative to the support, so that a magnitude of the rotation and/or rotational speed of the gimbal relative to the support is reduced.

The damping mechanism may be within a diameter of the flywheel.

The damping mechanism may comprise a damper coupled between the gimbal and the support.

The damping mechanism may comprise a rotary damper or a linear damper.

The damping mechanism may comprise a rotary damper, and the rotary damper may comprise: a rotor coupled to the gimbal so as to rotate with the gimbal; and a damping chamber filled with a damping fluid; wherein the rotor is inside the damping chamber and arranged to rotate within the damping chamber.

The damping chamber may be connected to, or part of, or integral with the support.

The damping chamber may be connected to, or part of, or integral with the support portion, for example each of the support arms.

The damping mechanism may comprise a linear damper, a first end of the linear damper may be rotatably coupled to the gimbal, and a second end of the linear damper may be rotatably coupled to the support.

The linear damper may comprise a crank mechanism for converting rotary motion of the gimbal into linear motion of a piston of the linear damper.

The damping mechanism may be located within the gimbal, i.e. within the outer envelope of the gimbal.

The support portion may comprise the damping mechanism. In other words, the damping mechanism may be attached to, or integrated into, the support portion.

The damping mechanism may be located where the gimbal is pivoted to the support, and may form part of the pivotal connection between the gimbal and the support.

Each of the support arms may comprise a damping mechanism for damping rotation of the gimbal relative to the support, each of the damping mechanisms being inside of the diameter of the flywheel. In other words, the damping mechanism may be attached to, or integrated into, each of the support arms.

The damping mechanism may be a damper.

The damping mechanism may comprise a passive damper or an active damper. An active damper is a damper in which an electronic control signal is used to control the damping provided by the damper. For example, an active damper could be an electronic brake, or a rotary or linear damper in which a size or shape of a control orifice (discussed below) in controlled electronically. A passive damper is a damper in which the damping provided by the damper is not electronically controlled. Various types of active and passive dampers are known and can be used as a damping mechanism in the present invention.

A rotary damper typically comprises a housing that encloses a damper chamber that is filled with a damper fluid having a specific viscosity. A rotor is pivotally mounted within the damper chamber so that the rotor can rotate within the damper chamber, so as to sweep around inside the damper chamber. A control orifice is formed between a rear surface of the rotor and a protruding portion of the housing.

When the rotor rotates to the left or the right within the damper chamber, the rotor displaces the damper fluid within the damper chamber and forces the damper fluid through the control orifice. The relatively small size of the control orifice means that a significant pressure is required to force a significant amount of fluid through the control orifice. The rotary damper therefore provides resistance to rotation of the rotor within the damper chamber.

In the present invention, the damper chamber may be incorporated into the support portion. For example, damper chambers may be incorporated into each of the two support arms.

Therefore, each of the support arms may comprises a main body of the damper, for example a dashpot body of the damper.

The gimbal may be coupled to a damping mechanism at each of the two pivot points on opposite sides of the gimbal.

The gimbal may be connected to a rotor of a rotary damper at each of the two pivot points.

For example, at each of the two pivot points the gimbal may be connected, either directly or via a shaft protruding from the gimbal, to a rotor that is rotatably mounted inside a damper chamber inside the support arm.

The rotors may be supported by bearings mounted in the support arms.

Therefore, the gimbal and the attached rotors can rotate relative to the support arms around the first axis, and rotation of the rotors and therefore the gimbal is damped due to the rotors being parts or rotary dampers incorporated into the support arms.

The flywheel may be rotatably supported by the gimbal by one or more bearings arranged between the flywheel and the gimbal.

The present inventors have also realised that where a damping mechanism is included, the damping mechanism may be a particularly bulky part of the gyroscopic stabiliser. Therefore, it is advantageous to position at least the damping mechanism within a maximum width of the gimbal along the first axis, even if the bearings etc. for rotatably supporting the gimbal are outside of a maximum width of the gimbal.

Therefore, according to a second aspect of the present invention there is provided a gyroscopic stabiliser for stabilising motion of an object, the gyroscopic stabiliser comprising: a support for attaching to the object whose motion is to be stabilised; a gimbal rotatably supported by the support to be rotatable around a first axis relative to the support; a flywheel rotatably supported by the gimbal to be rotatable around a second axis relative to the gimbal, the second axis being orthogonal to the first axis; and a damping mechanism for damping rotation of the gimbal relative to the support; wherein the damping mechanism is at least partly within a maximum width of the gimbal along the first axis.

The gyroscopic stabiliser according to the second aspect of the present invention may have any of the features of the gyroscopic stabiliser discussed above. However, in the second aspect of the present invention the gimbal can be rotatably supported by the support outside of a maximum width of the gimbal along the first axis.

BRIEF DESCRIPTION OF THE DRAWINGS

Embodiments of the present invention will now be discussed, by way of example only, with reference to the accompanying Figures, in which.

DETAILED DESCRIPTION OF THE PREFERRED EMBODIMENTS AND FURTHER OPTIONAL FEATURES OF THE INVENTION

Aspects and embodiments of the present invention will now be discussed with reference to the accompanying figures. Further aspects and embodiments will be apparent to those skilled in the art.

Gyroscopic stabilisers according to embodiments of the present invention will now be discussed with reference to FIGS. 2 to 21.

Gyroscopic stabilisers according to embodiments of the present invention can be used to stabilise motion of an object. In one example application, the gyroscopic stabiliser may be used to reduce rolling or pitching motion of a marine vehicle, such as a boat or ship. However, the gyroscopic stabiliser may instead be used to stabilise motion of other types of vehicle, such as land or air vehicles, or other objects that may be subject to unwanted oscillations or movement.

FIGS. 2 to 6 illustrate a gyroscopic stabiliser 19 according to a first embodiment of the present invention. As shown in FIGS. 2 to 6, the gyroscopic stabiliser 19 comprises a gimbal support frame 21, which can be fixed to an object whose motion is to be stabilised, such as a marine vehicle. For example, the gimbal support frame 21 may be fixed to an object whose motion is to be stabilised using one or more brackets (not illustrated) mounted on the gimbal support frame 21.

The gimbal support frame 21 rotatably (pivotally) supports a gimbal 23 so that the gimbal 23 is rotatable (pivotable) around a first axis A relative to the gimbal support frame 21. The manner in which the gimbal 23 is supported by the gimbal support frame 21 is discussed in more detail below. In a standard orientation of the gimbal support frame 21 in this embodiment, the first axis A may be a substantially horizontal axis. However, in other embodiments the first axis A may be a vertical axis, or at an angle to the horizontal axis and vertical axis. Therefore, the orientation of the gyroscopic stabiliser in the figures is not intended to be limiting for the present invention.

The specific shape of the gimbal support frame 21 is not critical to the present invention, and the gimbal support frame 21 may therefore have a different shape to the example shape illustrated in FIGS. 2 to 6.

Figure 2:
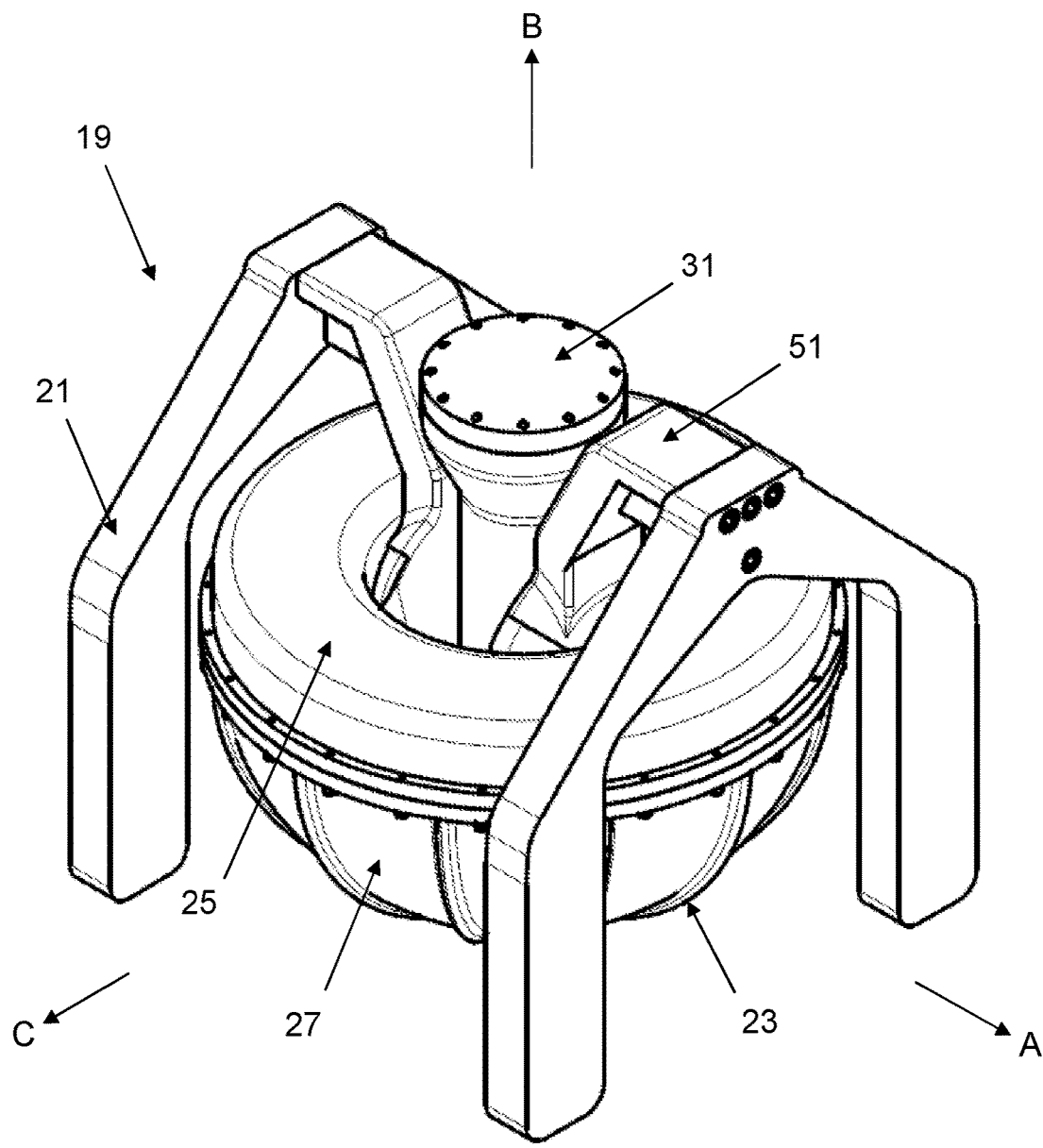
FIG. 2 is a first perspective view of a gyroscopic stabiliser according to a first embodiment of the present invention.

As shown in FIG. 2, for example, the gimbal support frame 21 comprise first and second support portions positioned on opposite sides of the gimbal 23 along the first axis A. The first and second support portions are each positioned within a maximum width of the gimbal 21 along the first axis A, such that the first and second support portions overlap with the gimbal 23 when the gyroscopic stabiliser 19 is viewed along the second axis B. In particular, each of the first and second support portions has an opening, and part of the gimbal 23 protrudes into the opening.

The extent of overlap between the first and second support portions and the gimbal 23 may be different in different embodiments. For example, in another embodiment the support portions may only partly overlap with the gimbal 23 along the first axis.

The size, shape and configuration of the openings in the first and second side portions may also be different in different embodiments.

Figure 6:
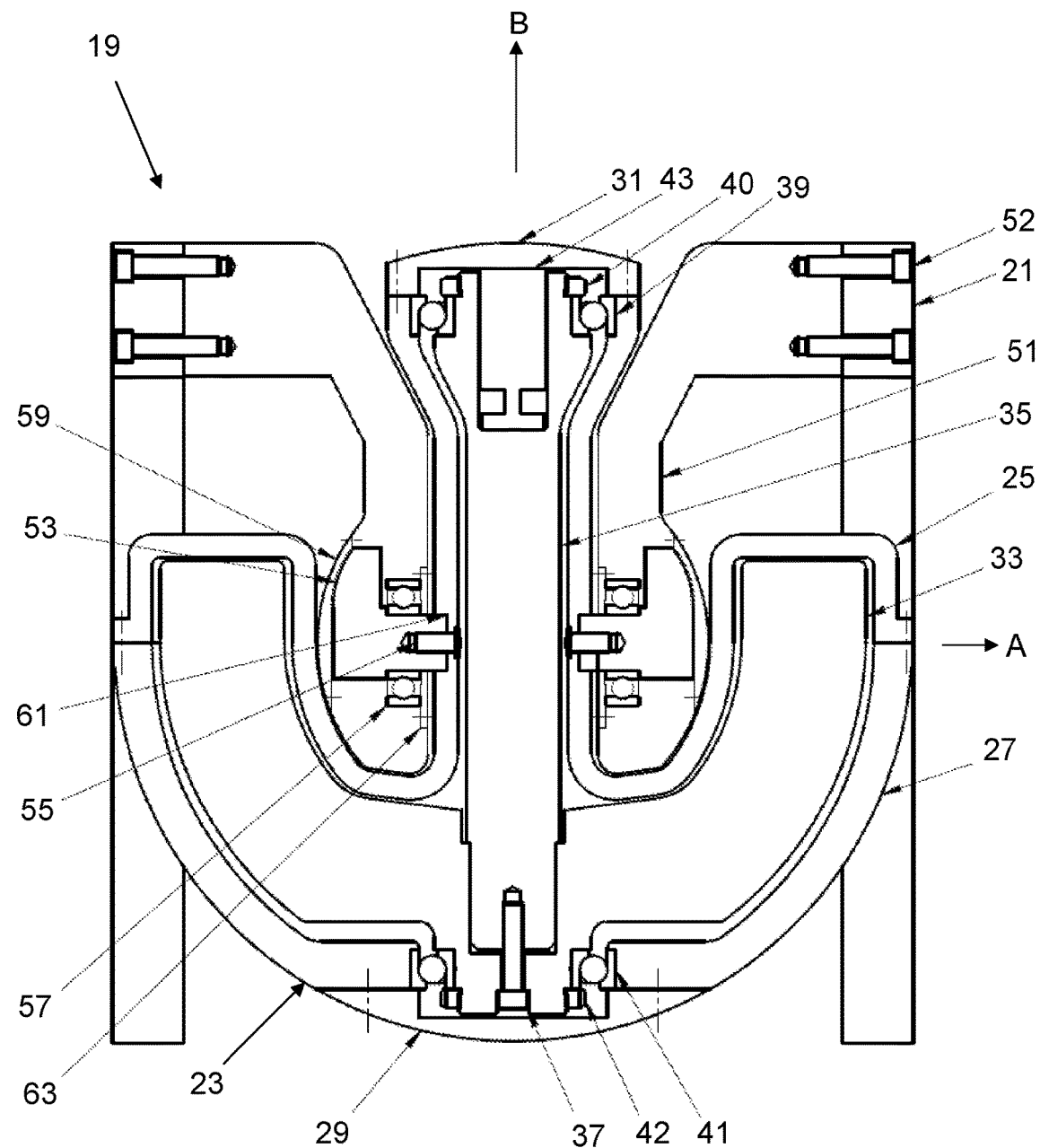
FIG. 6 is a cross-sectional view of the gyroscopic stabiliser according to the first embodiment of the present invention.

As illustrated most clearly in FIG. 6, in this embodiment the gimbal 23 primarily comprises a gimbal body 25, a gimbal cover 27, a first gimbal cap 29 and a second gimbal cap 31. Of course, in other embodiments the gimbal 23 may have a different configuration. For example, in other embodiments the gimbal 23 may comprise fewer or more component parts. For example, in an alternative embodiment the first and second gimbal caps 29 and 31 may be omitted.

A flywheel 33 and flywheel shaft 35 are enclosed within the gimbal 23. The flywheel 33 is fixed to the flywheel shaft 35 using a screw 37. Of course, alternative fixation means may be used instead of the screw 37, and it is also possible for the flywheel 33 and flywheel shaft 35 to alternatively be integral, i.e. formed as a single piece.

In this embodiment the flywheel 33 is non-planar, and more specifically the flywheel 33 is approximately U-shaped or cup-shaped. Of course, in other embodiments the flywheel 33 may have a different shape.

The flywheel shaft 35 is attached to a centre of the flywheel 33 and extends perpendicular to the flywheel 33.

The flywheel 33 is symmetrical about its centre.

Together, the gimbal body 25, gimbal cover 27, first gimbal cap 29 and second gimbal cap 31 form a casing, housing, shell or cage that substantially encloses and/or substantially surrounds and/or substantially covers the flywheel 33 and flywheel shaft 35. In particular, the gimbal body 25 substantially encloses and/or covers the flywheel shaft 35 and an upper surface of the flywheel 33. The gimbal cover 27 substantially encloses and/or covers a bottom surface of the flywheel 33. The first gimbal cap 29 covers a bottom end surface of the flywheel 33, and the second gimbal cap 31 covers a top end surface of the flywheel shaft 35. The different parts of the gimbal 23 are fastened together.

The shape of the gimbal 23 substantially corresponds to (substantially matches) the combined shape of the flywheel 33 and flywheel shaft 35. In particular, a shape and/or profile of an outer surface of the gimbal 23 substantially corresponds to (substantially matches) a combined shape and/or profile of a combined outer surface of the flywheel 33 and flywheel shaft 35.

Of course, in other embodiments, the gimbal 23 may have a different shape to the combined shape of the flywheel 33 and flywheel shaft 35.

An inner surface of the gimbal 23 is spaced apart from outer surfaces of the flywheel 33 and flywheel shaft 35, to facilitate rotation of the flywheel 33 and flywheel shaft 35 relative to the gimbal 23.

The flywheel 33 and flywheel shaft 35 are rotatably supported by the gimbal 23 so that the flywheel 33 and flywheel shaft 35 are rotatable together around a second axis B that is orthogonal to the first axis A. The second axis B is a longitudinal axis of the flywheel shaft 35. In a standard orientation of the gimbal support frame 21 in this embodiment, the second axis B may be a vertical axis, when the flywheel 33 and gimbal 23 are not precessing (discussed below). Of course, in other embodiments the second axis B may have a different orientation, for example horizontal, or at an angle to the vertical and horizontal.

In particular, in this embodiment the flywheel 33 and flywheel shaft 35 are rotatably mounted in the gimbal 23 by bearings provided between the flywheel 33 and flywheel shaft 35 and the gimbal 23. Specifically, in this embodiment angular contact bearings 39 and 41 are provided between the flywheel 33 and flywheel shaft 35 and the gimbal 23. Of course, in other embodiments other types of bearings may be used instead.

Angular contact bearing 39 is provided between the flywheel shaft 35 and the gimbal body 25. In particular, a static outer race of the angular contact bearing 39 is mounted in the gimbal body 25, and an inner race of the angular contact bearing 39 is mounted on the flywheel shaft 35. Angular contact bearing 39 is retained in place by a retaining nut 40. Angular contact bearing 39 is located adjacent to a distal end of the flywheel shaft 35, and an opposite end to the flywheel 33.

Angular contact bearing 41 is provided between the flywheel 33 and the gimbal cover 27. In particular, a static outer race of the angular contact bearing 41 is mounted in the gimbal cover 27, and an inner race of the angular contact bearing 41 is mounted on the flywheel 33. Angular contact bearing 41 is retained in place by a retaining nut 42. Angular contact bearing 41 is located at a bottom surface of the flywheel 33 that is opposite to the flywheel shaft 35.

Of course, in other embodiments alternative configurations for rotatably mounting the flywheel 33 and flywheel shaft 35 in the gimbal 23 may be used instead of this configuration, for example other types or arrangements of bearings may be provided instead. The specific number and arrangement of bearings in this example is not intended to be limiting for the present invention.

An electric motor is provided in the gimbal 23 to drive the flywheel 33 and flywheel shaft 35 to rotate relative to the gimbal 23.

Of course, in other embodiments a different arrangement for driving rotation of the flywheel 33 and flywheel shaft 35 may be used instead of an electric motor provided in the gimbal 23.

As mentioned above, the gimbal 23 is rotatably (pivotally) supported by the gimbal support frame 21, so that the gimbal 23 is rotatable (pivotable) around the first axis A relative to the gimbal support frame 21.

As illustrated in FIG. 6, the gimbal 23 is rotatably supported by the gimbal support frame 21 within (inside of) a maximum width of the gimbal 23 along the first axis.

In other words, along the first axis, the positions at which the gimbal 23 is rotatably supported by the gimbal support frame 21 are between the outermost edges of the gimbal 23 along the first axis.

As illustrated in FIG. 6, the gimbal 23 is rotatably supported by the gimbal support frame 21 inside of a diameter of the flywheel 33. Put another way, when the gyroscopic stabiliser 19 is viewed along the second axis B (i.e. from above in FIG. 6), the position at which the gimbal 23 is rotatably supported by the gimbal support frame 21 is inside of the diameter of the flywheel 33, i.e. it overlaps with the flywheel 33. This is further illustrated in FIG. 5, for example.

Furthermore, the gimbal 23 is rotatably supported by the gimbal support frame 21 at a position inside a space enclosed by the U-shaped or cup-shaped flywheel 33, between the flywheel shaft 35 and the flywheel 33.

In this embodiment, the gimbal support frame 21 comprises a support portion 51 that extends inwards from an outer portion of the gimbal support frame 21 to rotatably (pivotably) support the gimbal 23 at the position that is inside of the diameter (or outer circumference) of the flywheel 33.

In this embodiment, the gimbal 23 is rotatably supported by the gimbal support frame 21 at two pivot points on opposite sides of the gimbal 23. The two pivot points are inside of the diameter (and outer circumference) of the flywheel 33. More specifically, the two pivot points are located on the gimbal body 25 adjacent to the flywheel shaft 35 and on opposite sides of the flywheel shaft 35.

The specific configuration of the pivot points is not essential to the present invention, and various different known types of pivoting can be used in the present invention in addition to the specific example given below.

More specifically, in this embodiment the support portion 51 comprises two support arms 51 that extend inwards from the outer portion of the gimbal support frame 21 on opposite sides of the gimbal 23 to rotatably support the gimbal 23 at the two pivot points on opposite sides of the gimbal 23. The gimbal 23 is pivoted relative to the two support arms 51 at the pivot points, to allow the gimbal 21 to rotate around the first axis A relative to the gimbal support frame 21. The first axis A passes through the two pivot points.

As shown in FIG. 6, each of the support arms 51 is fastened to the outer portion of the gimbal support frame 21 using fasteners 52. However, in an alternative embodiment the support arms 51 may be integral with the gimbal support frame 21, or may be attached to the gimbal support frame 21 in a different manner.

The specific shape of the support arms 51 illustrated in FIG. 6 is not essential to the present invention, and the support arms 51 may instead have a different shape. In addition, the same functionality may be achieved with a single support arm rather than with two support arms.

The manner in which the gimbal 23 is rotationally supported by the gimbal support frame 21 in the present invention means that the gimbal 23 is able to rotate around the first axis A relative to the gimbal support frame 21, but is unable to rotate around any other axis relative to the gimbal support frame 21. In other words, the gimbal 23 is constrained to only be able to rotate relative to the gimbal support frame 21 around the first axis A.

As mentioned above in the discussion of the typical gyroscopic stabiliser 1, it is desirable (but not essential) to provide dampers to damp rotation of the gimbal relative to the gimbal support frame, in order to prevent excessive stabilising torques from being generated by the gyroscopic stabiliser.

Therefore, in this embodiment the gyroscopic stabiliser 19 comprises a damping mechanism for damping rotation of the gimbal 23 relative to the gimbal support frame 21.

The damping mechanism is provided at the location where the gimbal 23 is rotatably supported by the gimbal support frame 21, and therefore the damping mechanism is also located inside of the diameter (and outer circumference) of the flywheel 33.

The damping mechanism may comprise a linear or rotary damper, for example, numerous examples of which are known.

For example, at one or both of the pivot points where the gimbal 23 is rotatably supported by the gimbal support frame 21, a rotor of a rotary damper may be coupled to the gimbal 23, so that the rotor of the rotary damper rotates together with the gimbal 23. For example, the rotor of the rotary damper may be connected to a shaft that extends from the gimbal 23 at the pivot point.

In the present embodiment, the damping mechanism is incorporated into the two support arms 51 that extend inwards from the outer portion of the gimbal support frame 21 on opposite sides of the gimbal 23 to rotatably support the gimbal 23 at the two pivot points on opposite sides of the gimbal 23.

Specifically, as shown in FIG. 6, at each of the two pivot points the gimbal body 25 is connected to a rotor 53 of a rotary damper via a fastener 55. The rotors 53 are located inside the support arms 51.

Gimbal bearings 57 are provided inside the support arms 51 between the support arms 51 and the rotors 53, to allow rotation of the rotors 53 within the support arms 51 relative to the support arms 51. Therefore, the gimbal 23 and the connected rotors 53 are able to rotate relative to the gimbal support frame 21 around the first axis A.

Within each of the support arms 51 is provided a damper chamber that is filled with a damper fluid having a specific viscosity. The rotor 53 is located within the damper chamber and is able to rotate within the damper chamber. Rotation of the rotor 53 within the damper chamber displaces the damper fluid and forces the damper fluid through a control orifice having a predetermined size. This process provides resistance to rotation of the rotor 53 within the damper chamber, and therefore provides resistance to relative rotation between the gimbal 23 and the gimbal support frame 21. Such rotary dampers are well known.

The damper chamber may be covered by a removable cover 59.

A serrated or square joint 61 may be provided between the gimbal body 25 and the rotor 53, to ensure that the rotor 53 rotates securely together with the gimbal body 25.

An internal surface of the damper chamber may be covered by a removable cover plate 63.

Figure 7:
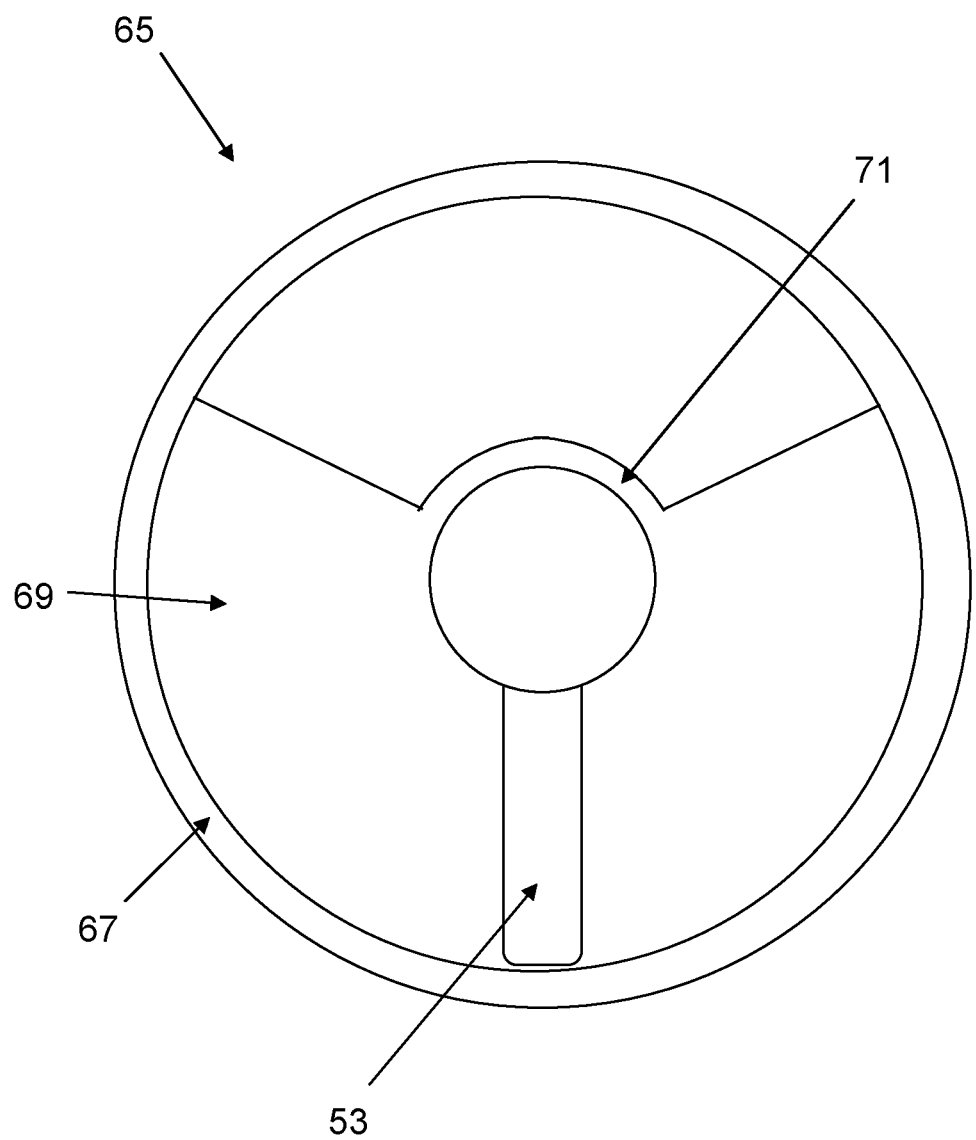
FIG. 7 is a schematic illustration of a rotary damper that can be used in embodiments of the present invention.

An example of a typical rotary damper that could be used in the present invention is illustrated in FIG. 7. However, the shape of the rotary damper may be different in the present invention.

As shown in FIG. 7, the rotary damper 65 comprises a housing 67 that encloses a damper chamber 69 that is filled with a damper fluid having a specific viscosity. A rotor 53 is pivotally mounted within the damper chamber 69 so that the rotor 53 can rotate within the damper chamber 69, so as to sweep around inside the damper chamber. A control orifice 71 is formed between a rear surface of the rotor 53 and a protruding portion of the housing 67.

When the rotor 53 rotates to the left or the right within the damper chamber 69, the rotor 53 displaces the damper fluid within the damper chamber 69 and forces the damper fluid through the control orifice 71. The relatively small size of the control orifice 71 means that a significant pressure is required to force a significant amount of fluid through the control orifice 71. The rotary damper 65 therefore provides resistance to rotation of the rotor 53 within the damper chamber 69.

In the present invention, since the gimbal 23 is directly coupled to the rotor 53, there is therefore resistance to rotation of the gimbal 23 relative to the gimbal support frame 21. The rotary damper therefore acts to damp rotation of the gimbal 23 relative to the gimbal support frame 21, preventing the generation of excessive stabilisation torques.

In the present invention, the housing 67 that encloses the damper chamber 69 is formed within the support arm 51. The rotary damper is therefore incorporated within the support arm 51.

In particular, the rotary damper forms part of the pivot point at which the gimbal 23 is rotatably supported by the gimbal support frame 21, and is located in the space enclosed by the U-shaped or cup-shaped flywheel 33.

The rotary dampers are located within the gimbal 23, inside an envelope of the gimbal 23.

Figure 5:
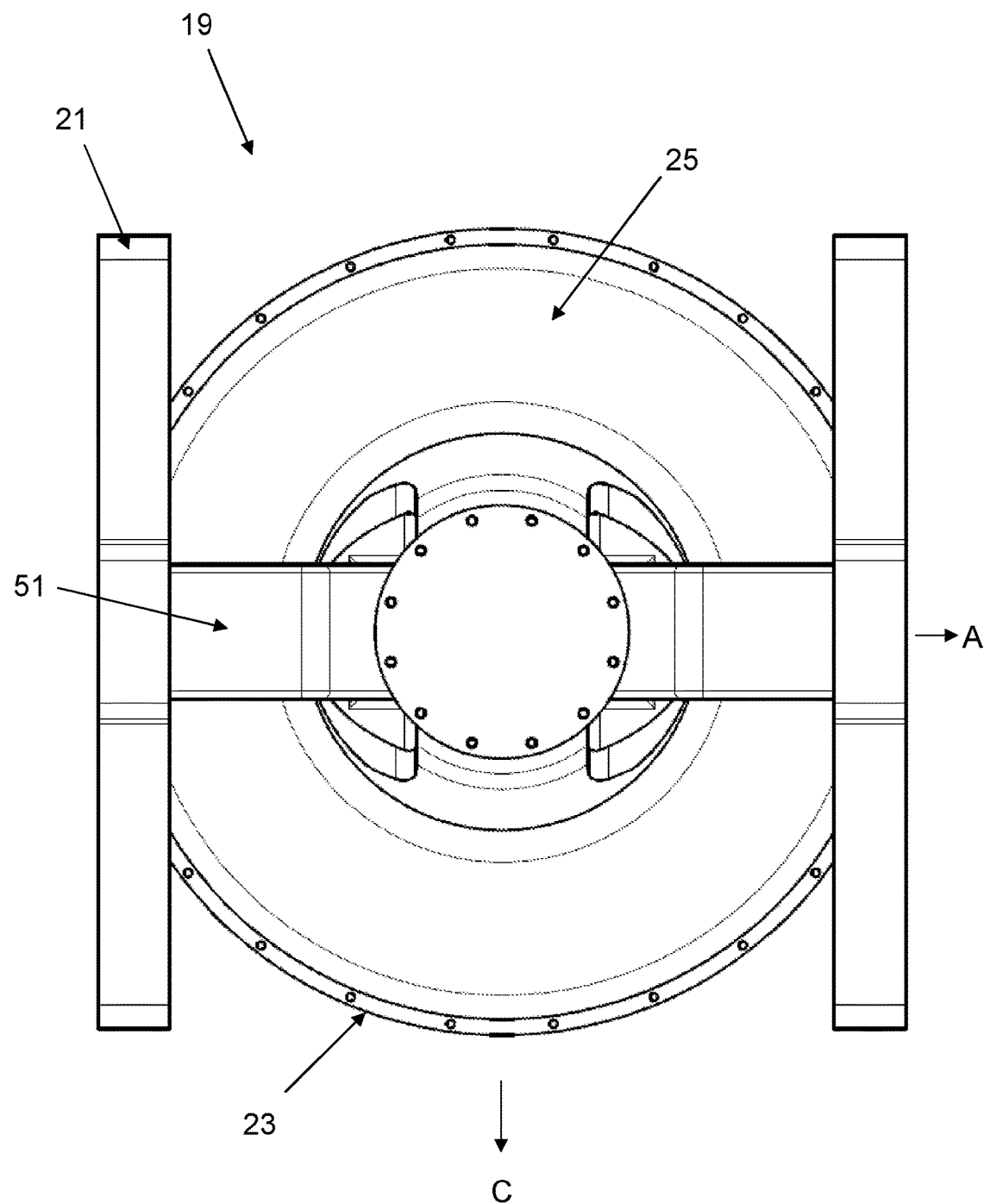
FIG. 5 is a plan view of the gyroscopic stabiliser according to the first embodiment of the present invention.

As illustrated in FIGS. 5 and 6, for example, the novel configuration of the gyroscopic stabiliser 19 of the present invention means that the outer envelope of the gyroscopic stabiliser 19 can be defined by the outer circumference of the gimbal 23. In particular, as shown in FIG. 6, in a horizontal plane (A-C plane in the figures) the horizontal size of the gyroscopic stabiliser 19 is substantially equal to the horizontal size of the gimbal 23, and therefore substantially equal to the diameter of the flywheel 33.

This is possible in the present invention because the gimbal is rotatably supported by the gimbal support frame 21 within a maximum width of the gimbal 23 along the first axis A, when the gyroscopic stabiliser 19 is viewed from above along the second axis B, instead of at positions outside of the maximum width of the gimbal 23 along the first axis.

More specifically, the support arms 51 of the gimbal support frame 21 extend inwards from an outer portion of the gimbal support frame, and the gimbal 23 is pivotally connected to the support arms 51 at positions that are inside of the diameter of the flywheel 33.

In particular, the gimbal 23 is pivotally connected to the support arms 51 at positions that are in a space enclosed by the U-shaped or cup-shaped flywheel 33, on opposite sides of the flywheel shaft 35.

In addition, the damping mechanism is also located inside of the diameter of the flywheel 33, because the damping mechanism is incorporated into the support arms 51 of the gimbal support frame 21 and forms part of the pivotal connection between the support arms 51 and the gimbal 23.

As shown in FIGS. 5 and 6, for example, a width of the gyroscopic stabiliser along the first axis A is substantially equal to a width of the gimbal along the first axis A. In addition, a width of the gyroscopic stabiliser along the third axis C that is orthogonal to the first axis A is substantially equal to a width of the gimbal along the third axis.

Therefore, the maximum size of the gyroscopic stabiliser along the first axis A and the third axis C (the two horizontal axes in a standard orientation of the gyroscopic stabiliser) is substantially equal to the maximum size of the gimbal along the first axis A and the third axis C.

Figure 1:
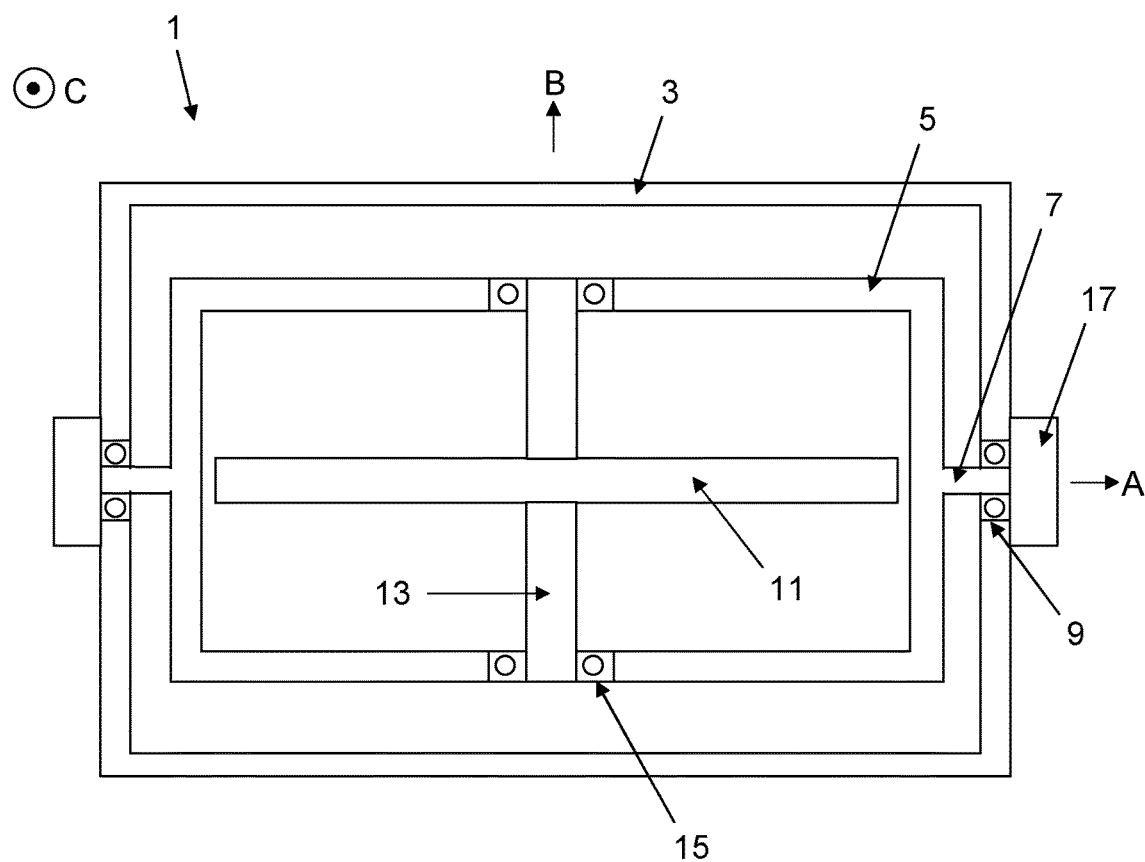
FIG. 1 is an illustration of a typical gyroscopic stabiliser.

Therefore, in the present invention it is not necessary to provide bearings and damping arrangements external to the gimbal along the first axis A as in the conventional gyroscopic stabiliser illustrated in FIG. 1, and the size of the flywheel 33 can therefore be maximised for a given size of the gyroscopic stabiliser 19. As mentioned above in the discussion of the typical gyroscopic stabiliser 1, maximising the size of the flywheel maximises the magnitude of the stabilising torque generated by the gyroscopic stabiliser for a given size of the gyroscopic stabiliser.

Figure 8:
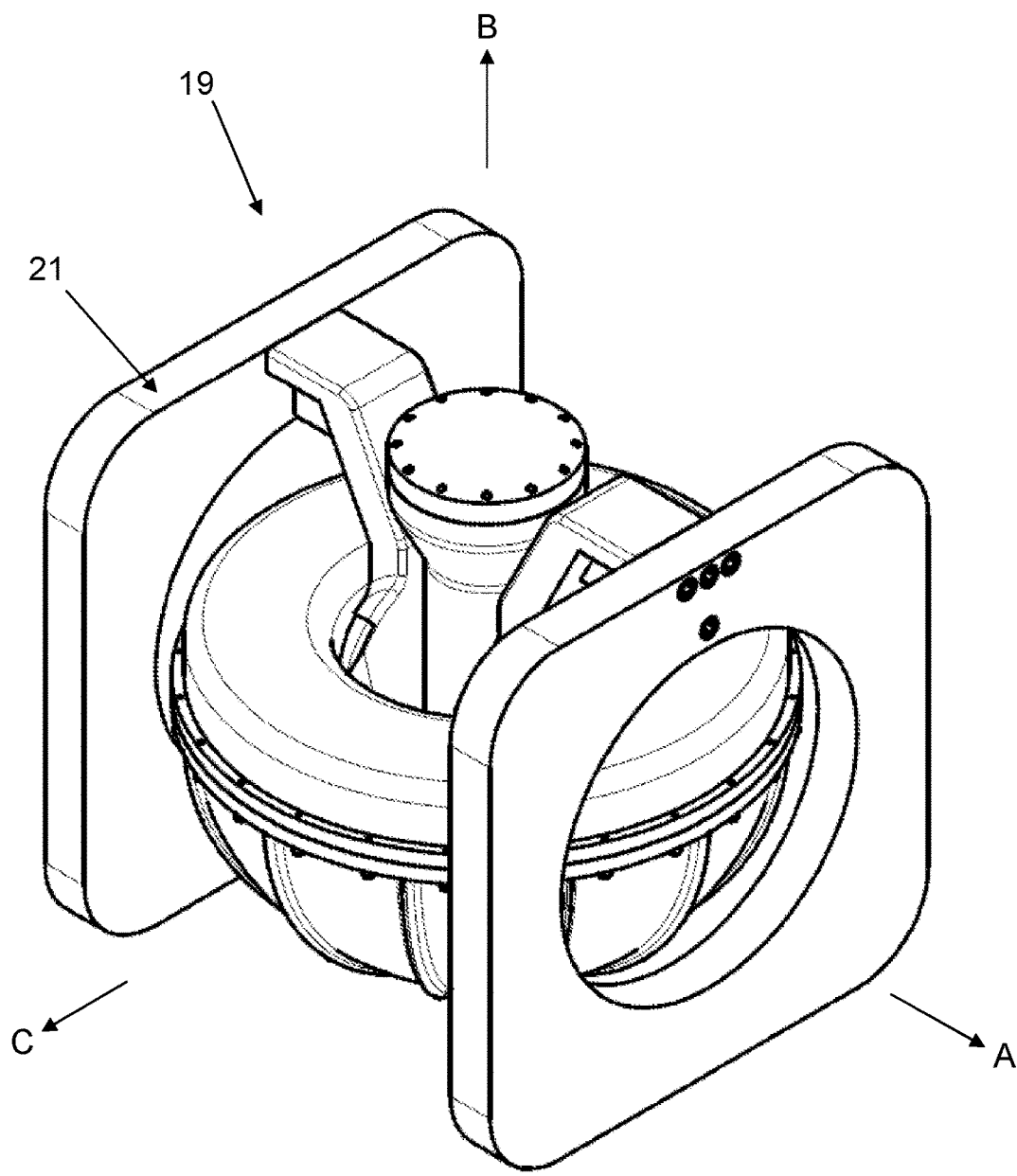
FIG. 8 is a perspective view of a gyroscopic stabiliser according to a second embodiment of the present invention.

A gyroscopic stabiliser 19 according to a second embodiment of the present invention is illustrated in FIG. 8. The gyroscopic stabiliser 19 according to the second embodiment differs from the gyroscopic stabiliser 19 according to the first embodiment solely in terms of the shape of the gimbal support frame 21. The other features of the gyroscopic stabiliser 19 according to a second embodiment are the same as for the first embodiment.

Figure 9:
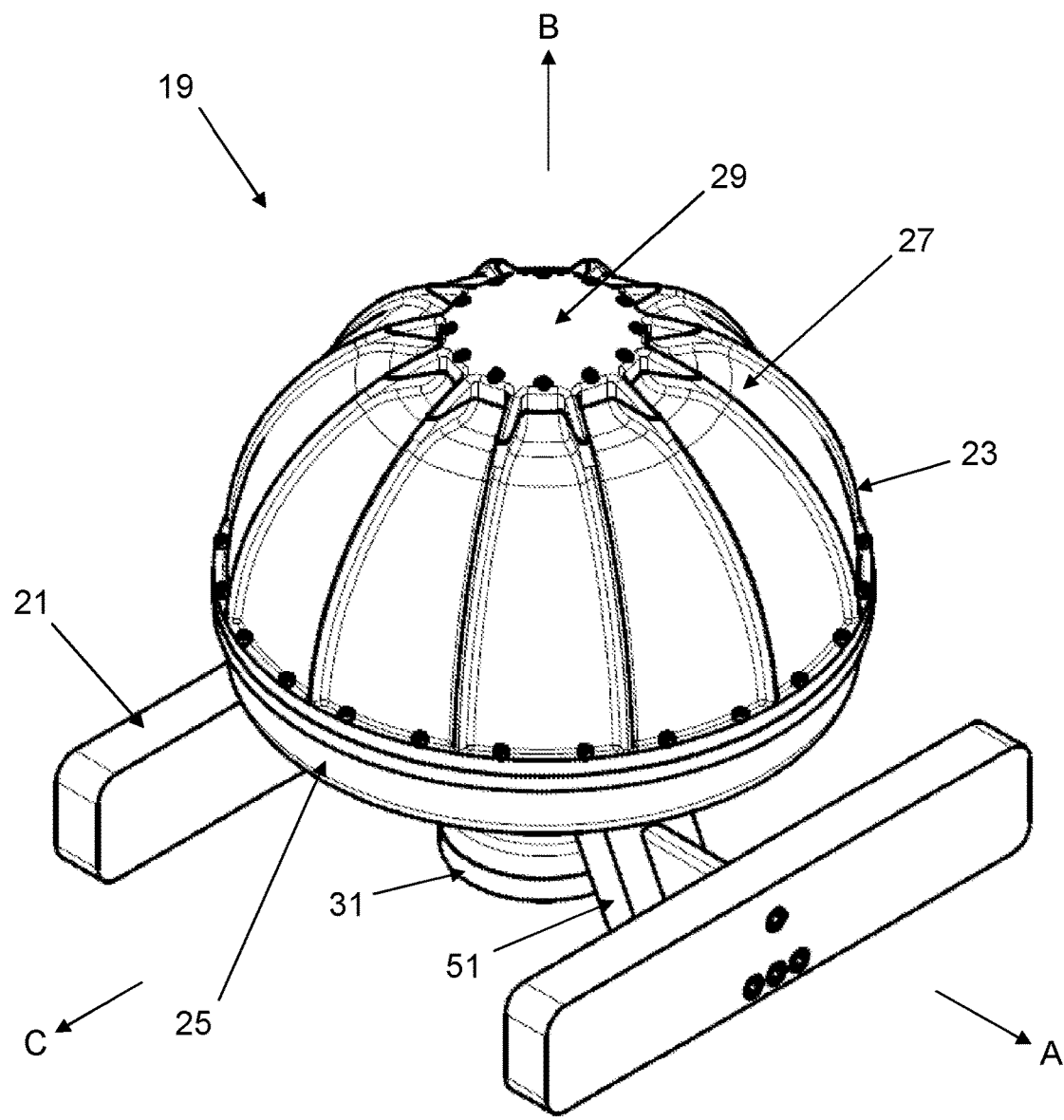
FIG. 9 is a perspective view of a gyroscopic stabiliser according to a third embodiment of the present invention.
Figure 10:
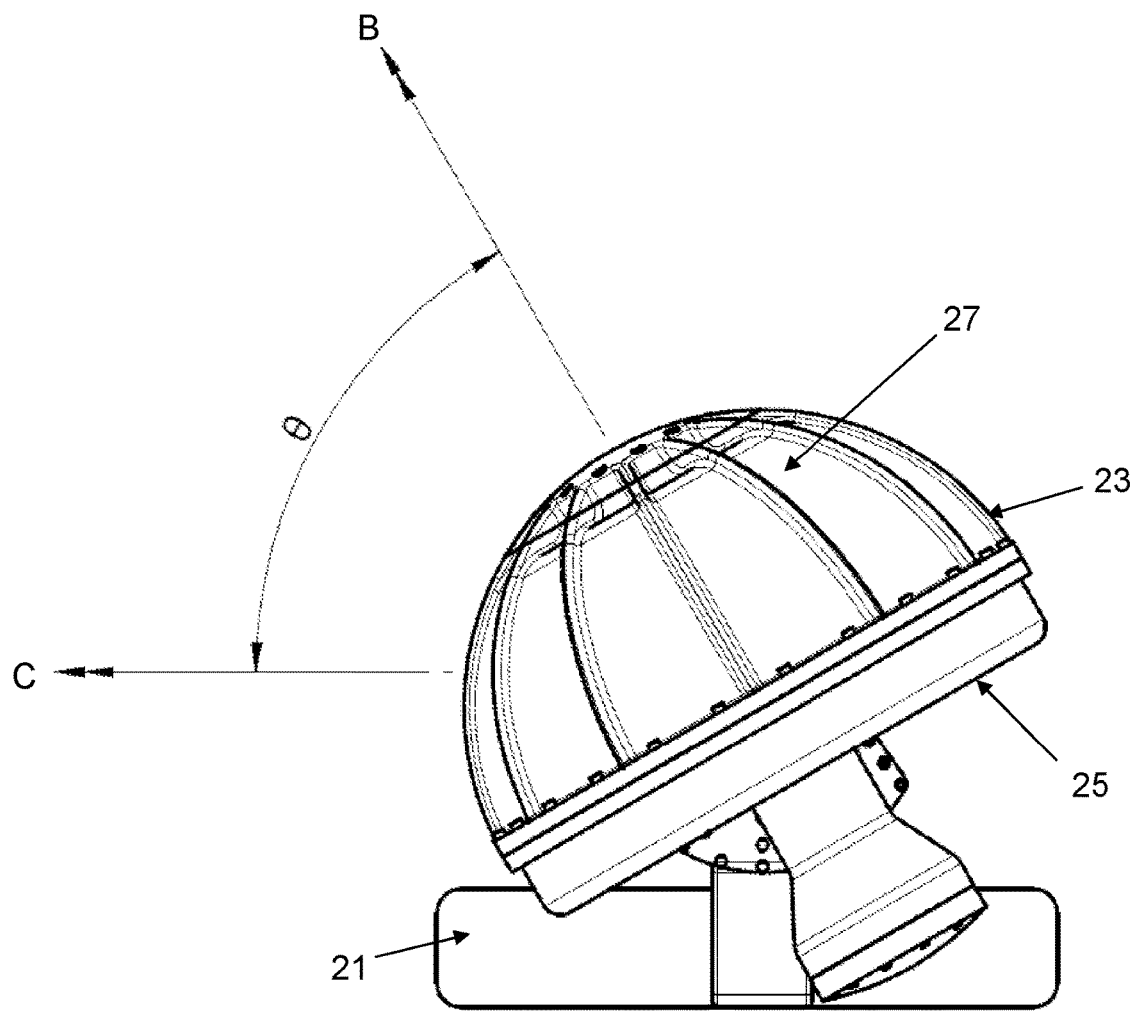
FIG. 10 is a side view of part of the gyroscopic stabiliser according to the third embodiment of the present invention.

A gyroscopic stabiliser according to a third embodiment of the present invention is illustrated in FIGS. 9 and 10. The gyroscopic stabiliser 19 according to the third embodiment includes the same features as the gyroscopic stabiliser 19 of the first embodiment, some of which are indicated in FIGS. 9 and 10 using the same reference numbers. Only the differences between the gyroscopic stabiliser 19 of the third embodiment and the gyroscopic stabiliser 19 of the first embodiment will be described here.

In the third embodiment, the orientation of the gimbal 21 is different to the first embodiment when the gyroscopic stabiliser 19 is attached to an object. In particular, in the third embodiment the gimbal 21 is upside down (rotated 180 degrees around a horizontal axis) relative to first embodiment when the gyroscopic stabiliser 19 is attached to an object. In other words, the cup-shaped or U-shaped flywheel 33 is positioned at a top of the gimbal 23, with the cup-shaped or U-shaped surface facing downwards (when the gimbal is not precessing), and with the flywheel shaft 35 below the flywheel 33. The gimbal 21 is otherwise the same as in the first embodiment.

The shape and configuration of the gimbal support frame 21 is also different in the third embodiment. However, the support arms 51 are equivalent to the support arms 51 in the first embodiment and have the same features.

Figure 11:
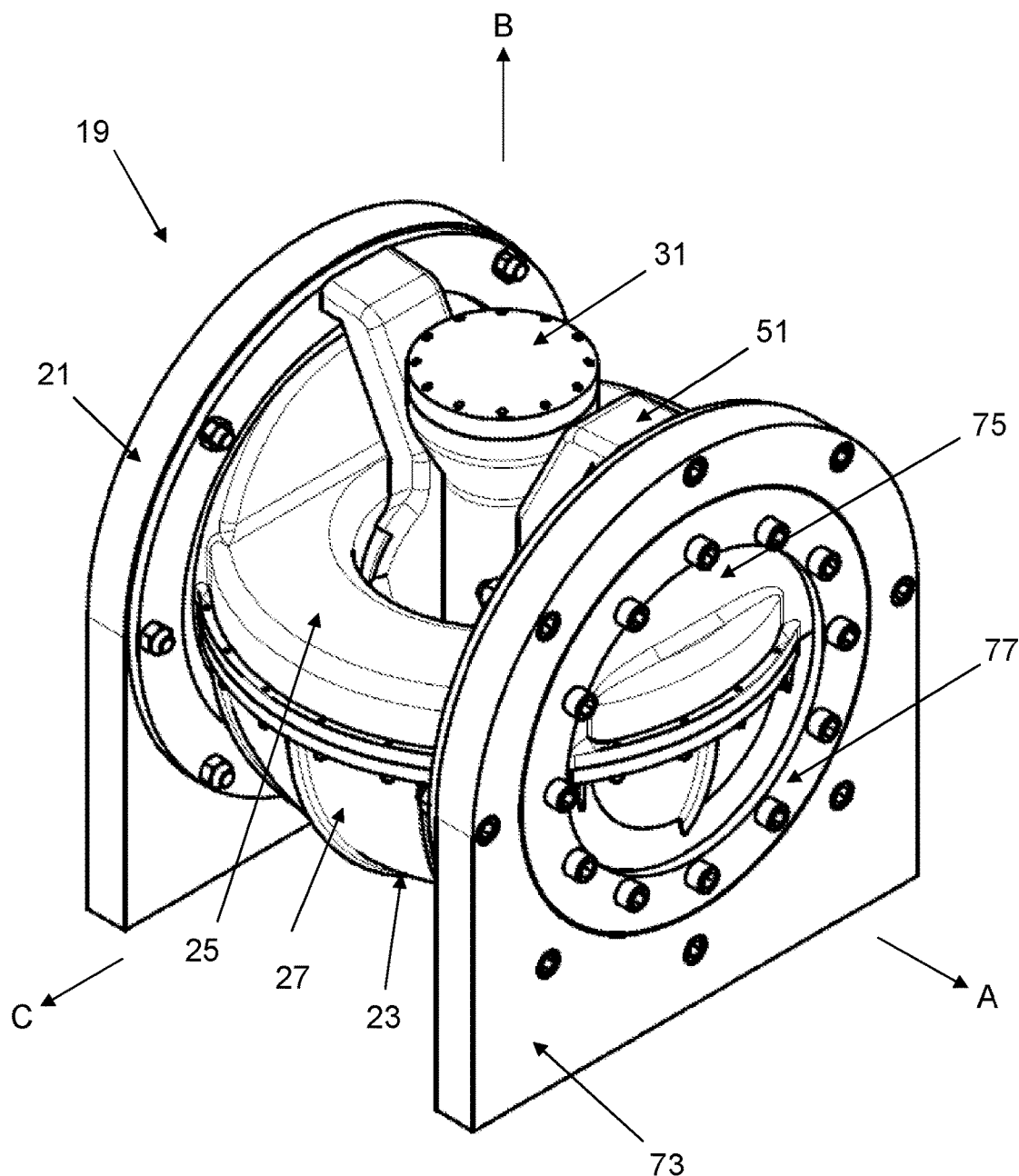
FIG. 11 is a perspective view of a gyroscopic stabiliser according to a fourth embodiment of the present invention.
Figure 12:
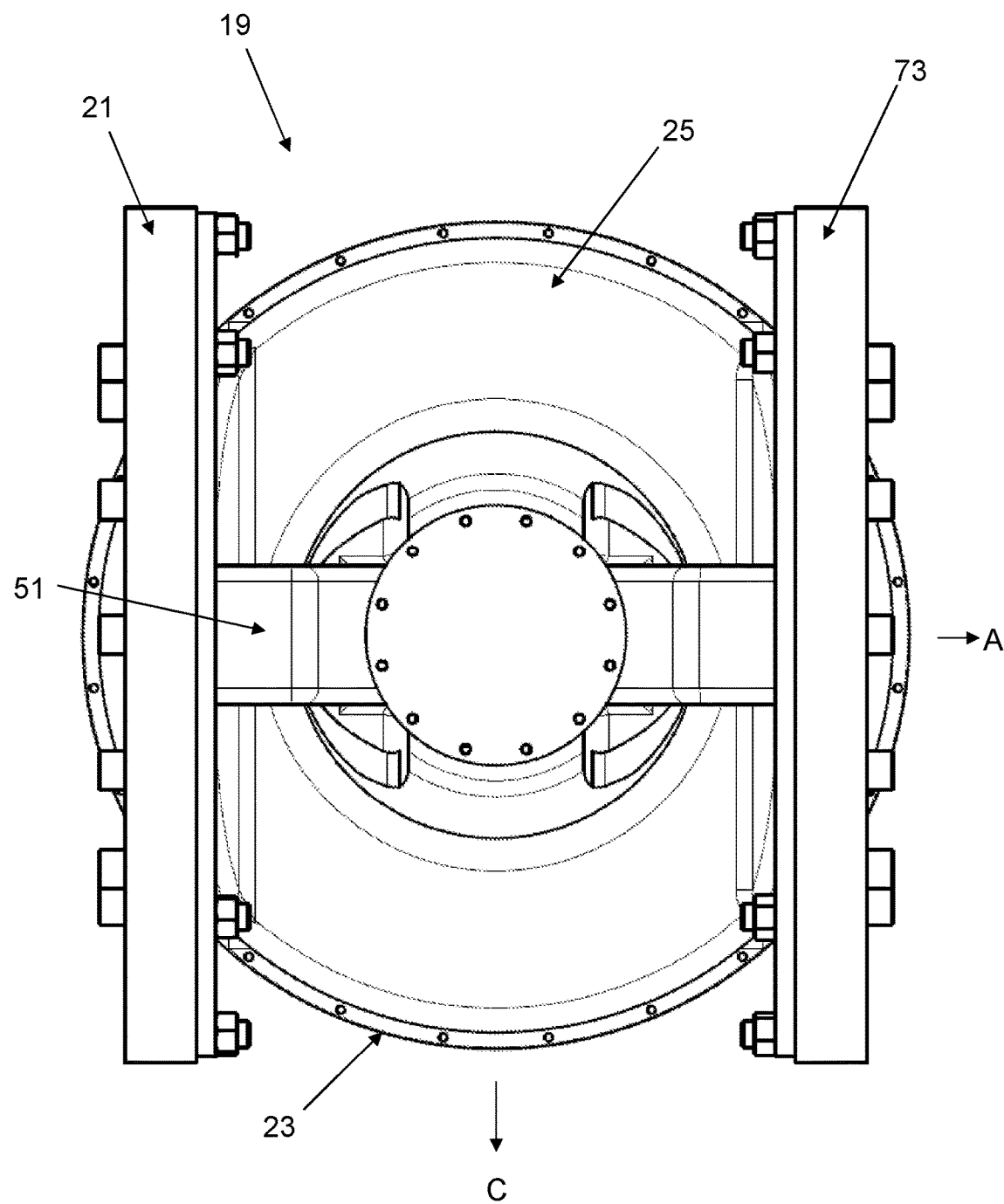
FIG. 12 is a plan view of the gyroscopic stabiliser according to the fourth embodiment of the present invention.
Figure 13:
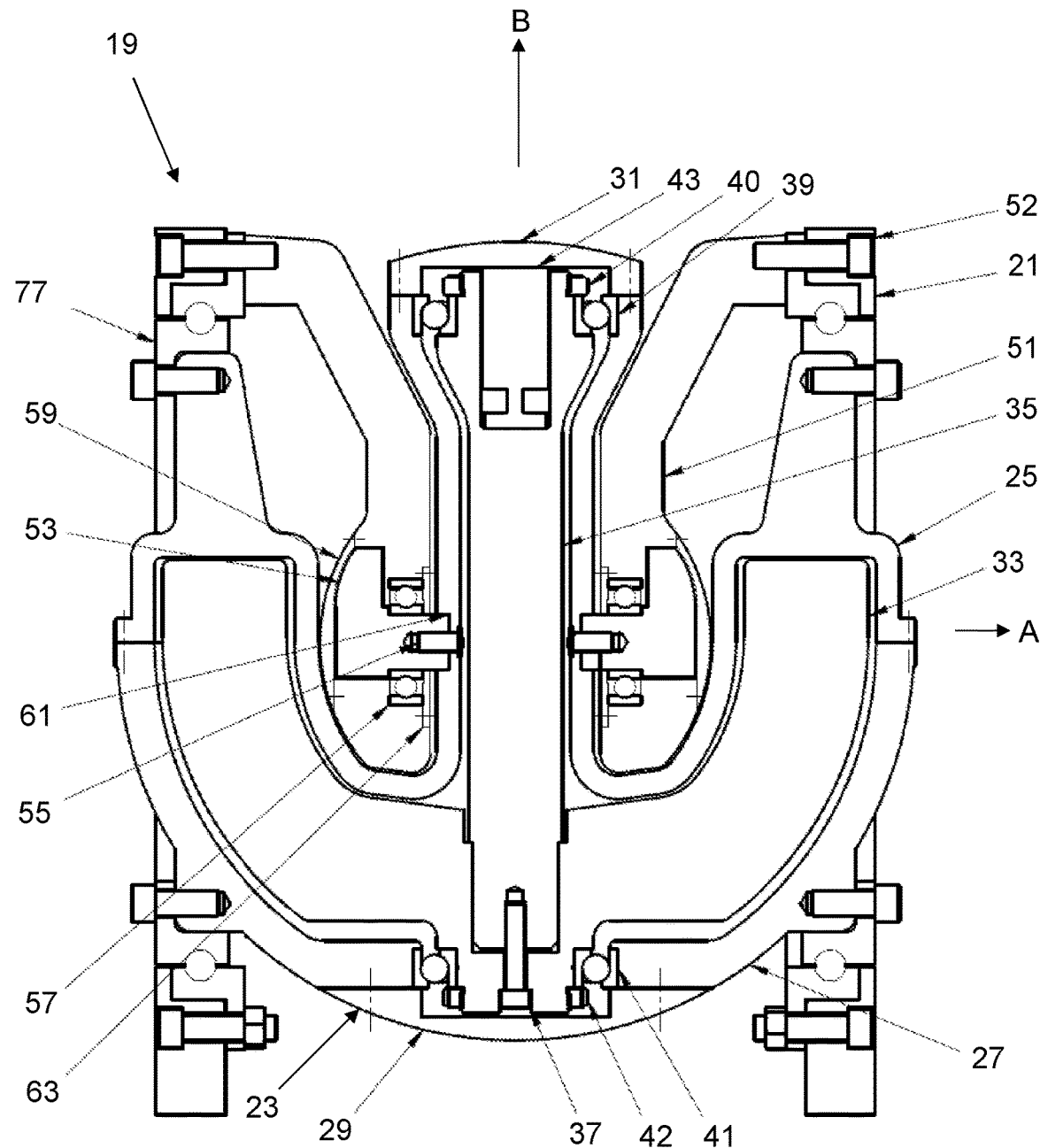
FIG. 13 is a cross-sectional view of the gyroscopic stabiliser according to the fourth embodiment of the present invention.
Figure 14:
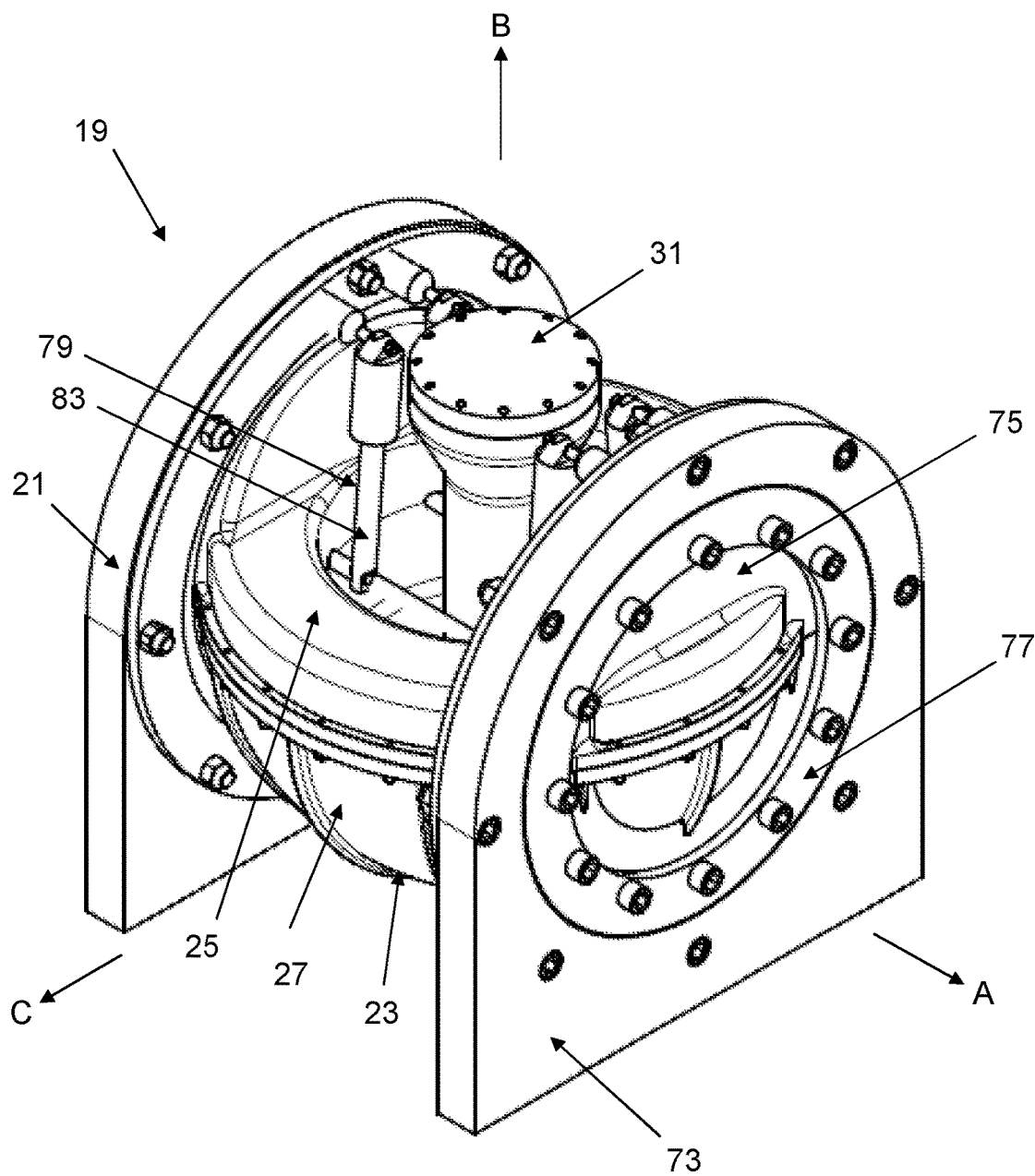
FIG. 14 is a first perspective view of a gyroscopic stabiliser according to a fifth embodiment of the present invention.
Figure 15:
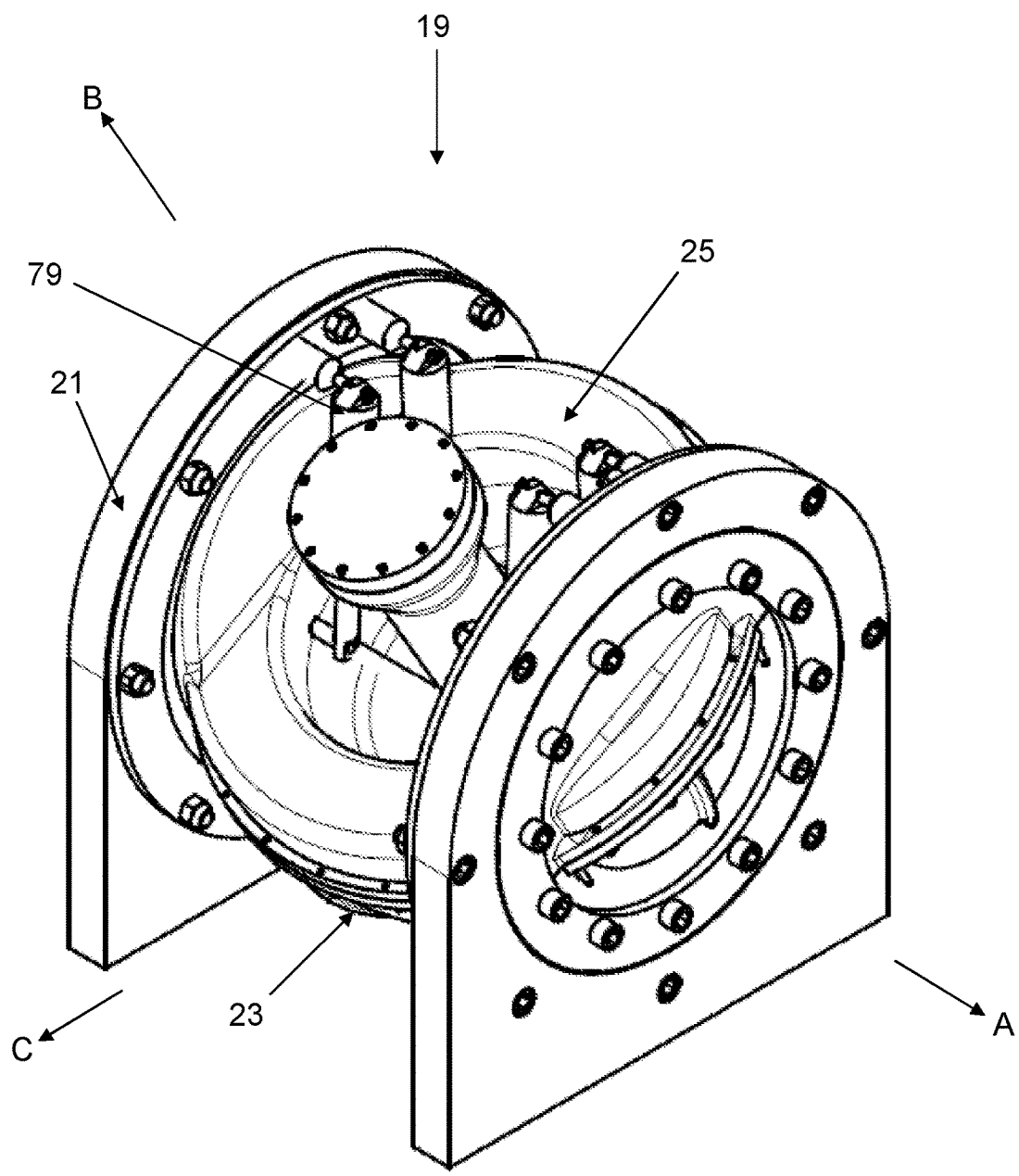
FIG. 15 is a second perspective view of the gyroscopic stabiliser according to the fifth embodiment of the present invention.
Figure 16:
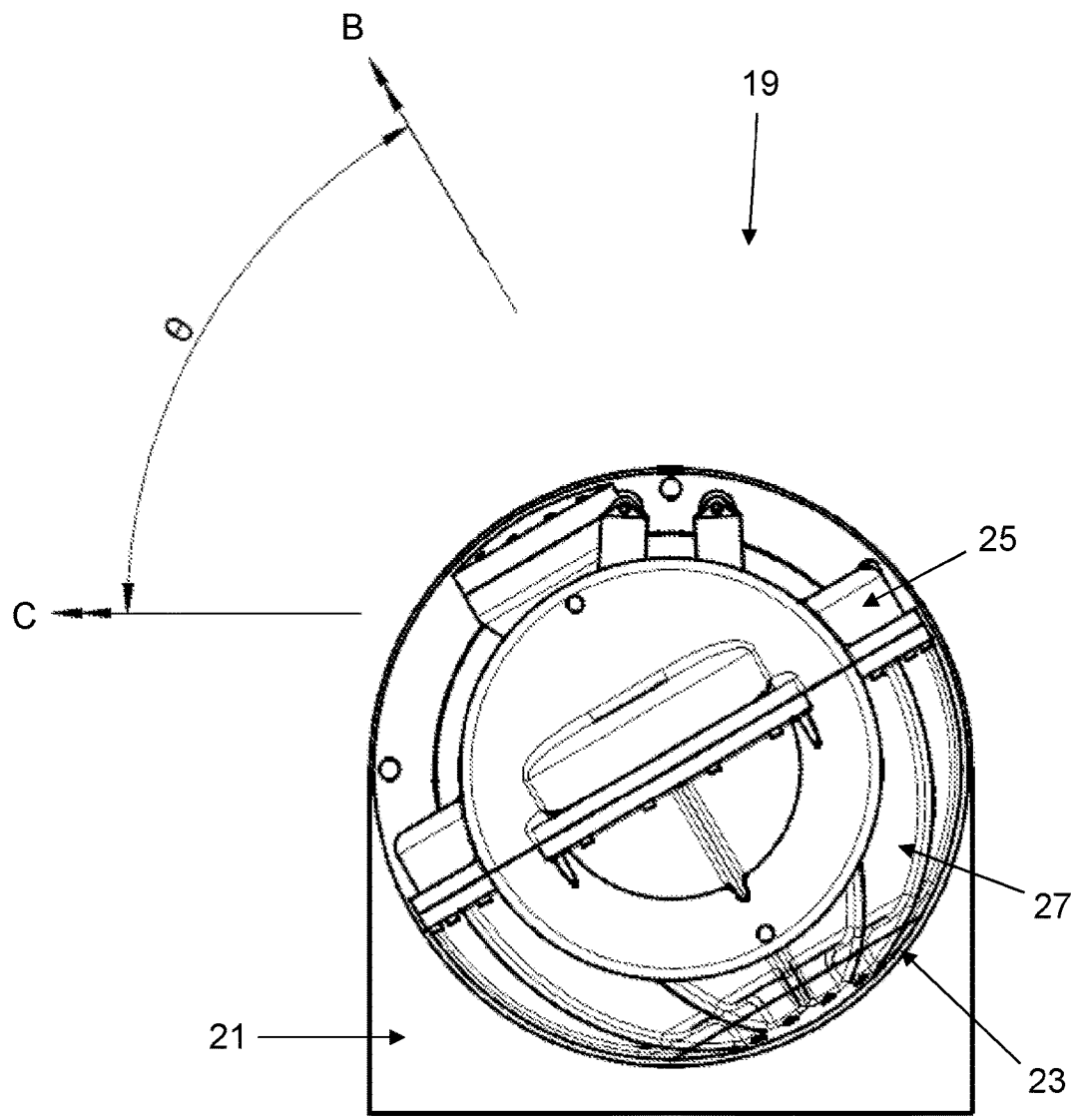
FIG. 16 is a side view of part of the gyroscopic stabiliser according to the fifth embodiment of the present invention.
Figure 17:
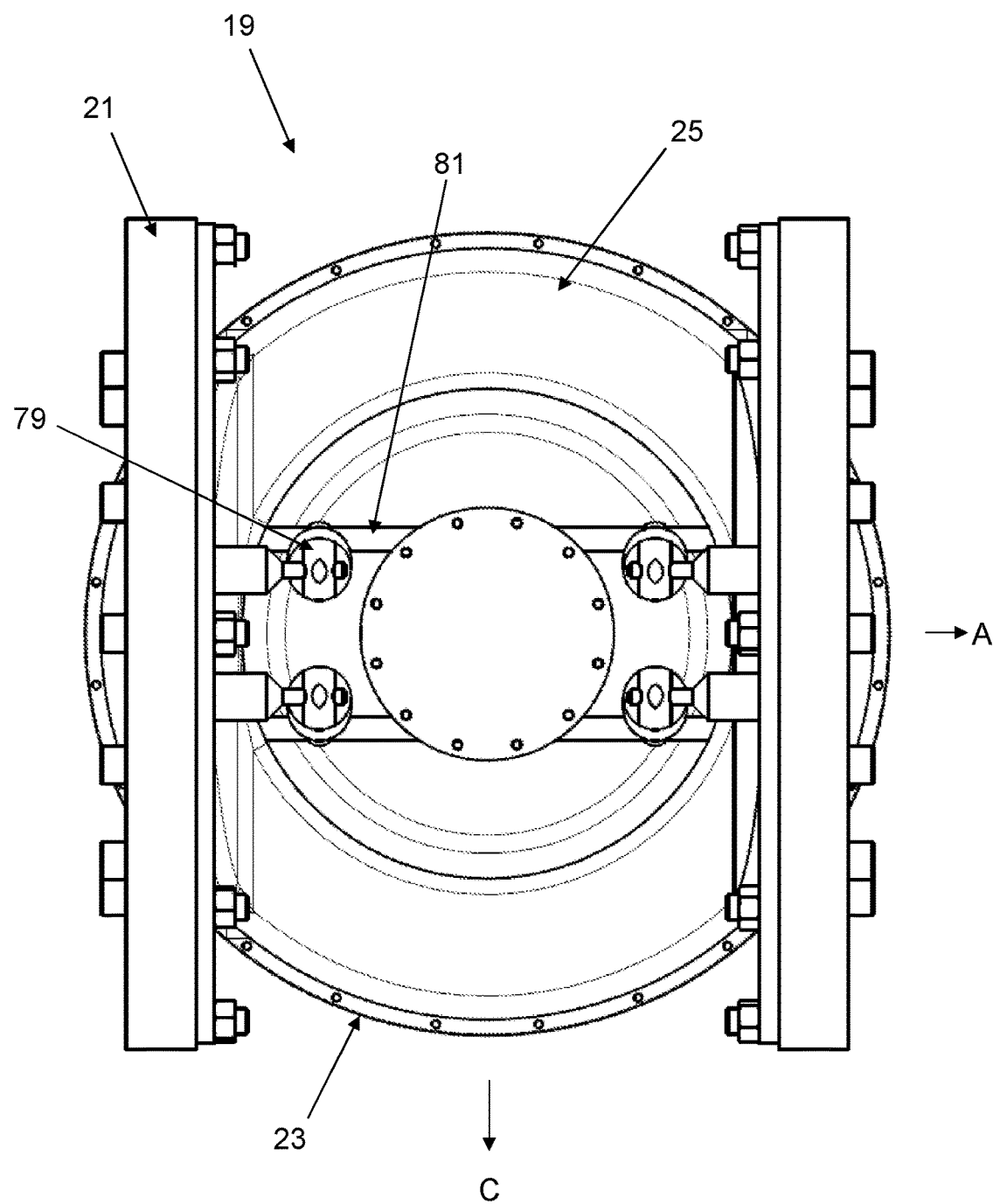
FIG. 17 is a plan view of the gyroscopic stabiliser according to the fifth embodiment of the present invention.

A gyroscopic stabiliser according to a fourth embodiment of the present invention is illustrated in FIGS. 11 to 13. The gyroscopic stabiliser 19 according to the fourth embodiment includes the same features as the gyroscopic stabiliser 19 of the first embodiment, some of which are indicated in FIGS. 11 to 13 using the same reference numbers. Only the differences between the gyroscopic stabiliser 19 of the fourth embodiment and the gyroscopic stabilisers 19 of the first embodiment will be described here.

The gyroscopic stabiliser 19 of the fourth embodiment differs from the gyroscopic stabiliser 19 of the first embodiment in that the gimbal 23 is rotatably supported by the gimbal support frame 21 via bearings between the gimbal 23 and the gimbal support frame 21.

As shown in FIG. 11, the gimbal support frame 21 includes first and second support portions 73 (for example support walls) on opposite sides of the gimbal 23 along the first axis.

Each of the gimbal support portions 73 is located along the first axis A within a maximum width of the gimbal 23 along the first axis A, as illustrated in FIG. 12 for example. Therefore, when the gyroscopic stabiliser 19 is viewed along the second axis B, the gimbal support portions 73 overlap with the gimbal 23 along the first axis A.

As shown in FIG. 11, each of the gimbal support portions 73 has an opening or hole 75 therein. A part of the gimbal 23 protrudes into the opening 75.

Slewing ring bearings 77 are positioned in the openings 75 between the gimbal 23 and the gimbal support frame 21. The slewing ring bearings 77 rotatably support the gimbal 23 relative to the gimbal support frame 21.

In the fourth embodiment the gimbal 23 is therefore rotatably supported by the gimbal support frame 23 both at the two support arms 51 and by the slewing ring bearings 77. All of these rotatable supports are within the diameter of the gimbal 23 (within a maximum width of the gimbal 23 along the first axis A).

The other features of the fourth embodiment are the same as for the first embodiment.

A gyroscopic stabiliser according to a fifth embodiment of the present invention is illustrated in FIGS. 14 to 18. The gyroscopic stabiliser 19 according to the fifth embodiment includes the same features as the gyroscopic stabiliser 19 of the first and fourth embodiments, some of which are indicated in FIGS. 14 to 18 using the same reference numbers. Only the differences between the gyroscopic stabiliser 19 of the third embodiment and the gyroscopic stabilisers 19 of the first and fourth embodiments will be described here.

The gyroscopic stabiliser 19 of the fifth embodiment differs from the gyroscopic stabiliser of the fourth embodiment in that the gyroscopic stabiliser does not include the support arms 51 or the rotary damper of the fourth embodiment.

Instead, the gyroscopic stabiliser 19 of the fifth embodiment includes linear dampers 79 instead of the support arms 51 or the rotary damper of the fourth embodiment.

Figure 18:
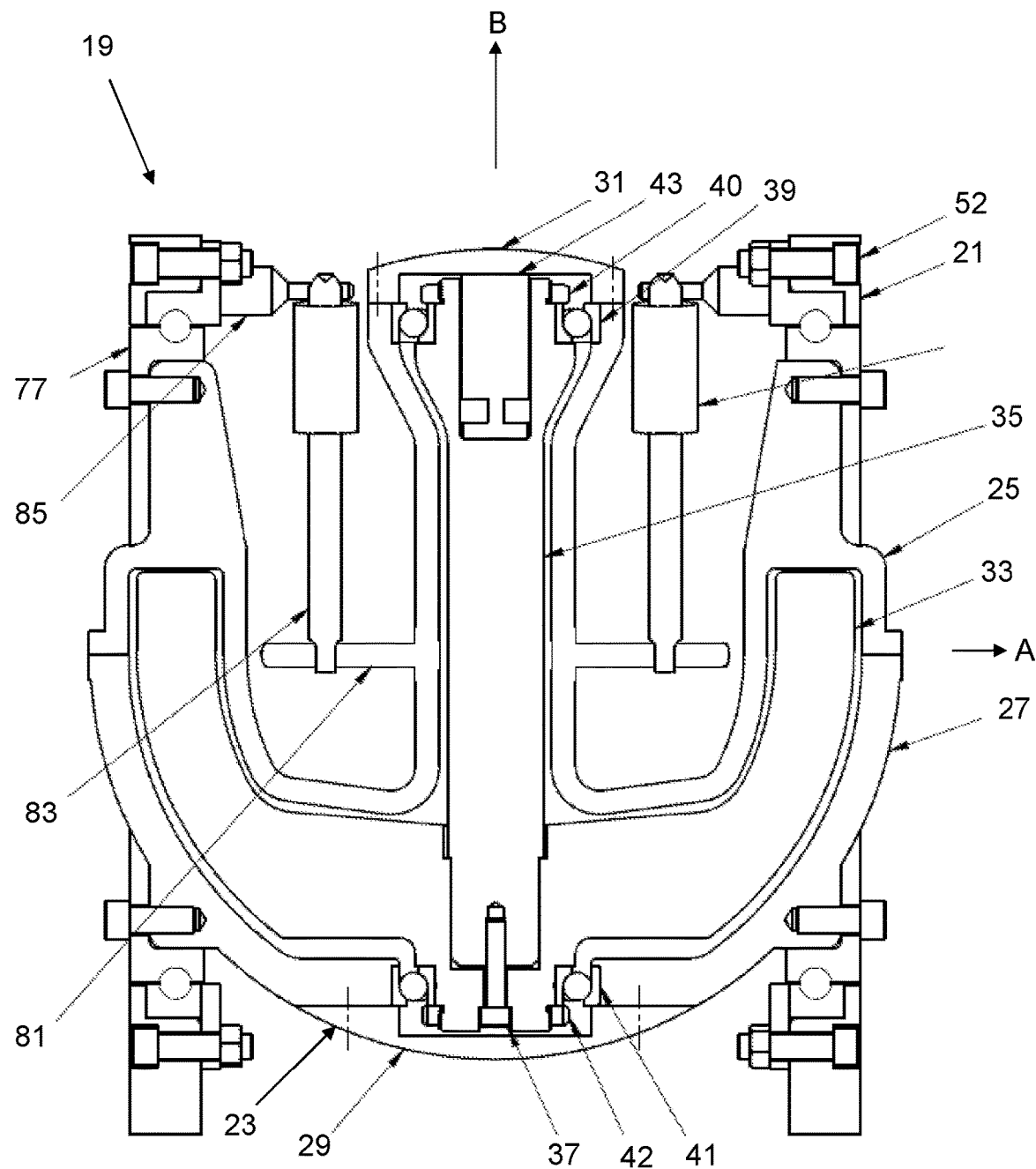
FIG. 18 is a cross-sectional view of the gyroscopic stabiliser according to the fifth embodiment of the present invention.

As shown in FIG. 18, for example, linear damper cross beams 81 extend from the gimbal 23 parallel to the first axis A.

Linear damper pistons 83 are rotatably connected to the linear damper cross beams 81, so that the linear damper cross beams 81 can rotate relative to the linear damper pistons 83.

The linear damper pistons 83 are also rotatably connected (at an opposite end of the linear damper piston 83) to a linear damper support pin 85 that extends from the gimbal support frame 21.

The linear damper pistons 83 include a piston that is slidably movable within a damper body that contains damping fluid, such that motion of the piston within the damper body is damped by the damping fluid.

More specifically, movement of the piston into the damper body is resisted by compression of the damping fluid in the damper body.

Therefore, when the gimbal 23 rotates relative to the gimbal support frame 21 (via the slewing ring bearings 77), the linear damper pistons 79 damp rotation of the gimbal 23 relative to the gimbal support frame 21.

In this embodiment, four linear dampers 79 are provided. However, in other embodiments the number of linear dampers, and/or the arrangement or configuration of the linear dampers may be different.

A first linear damper may be provided to damp rotation of the gimbal 23 in a first direction, and a second rotary damper may be provide to damp rotation of the gimbal 23 in a second direction.

Figure 19:
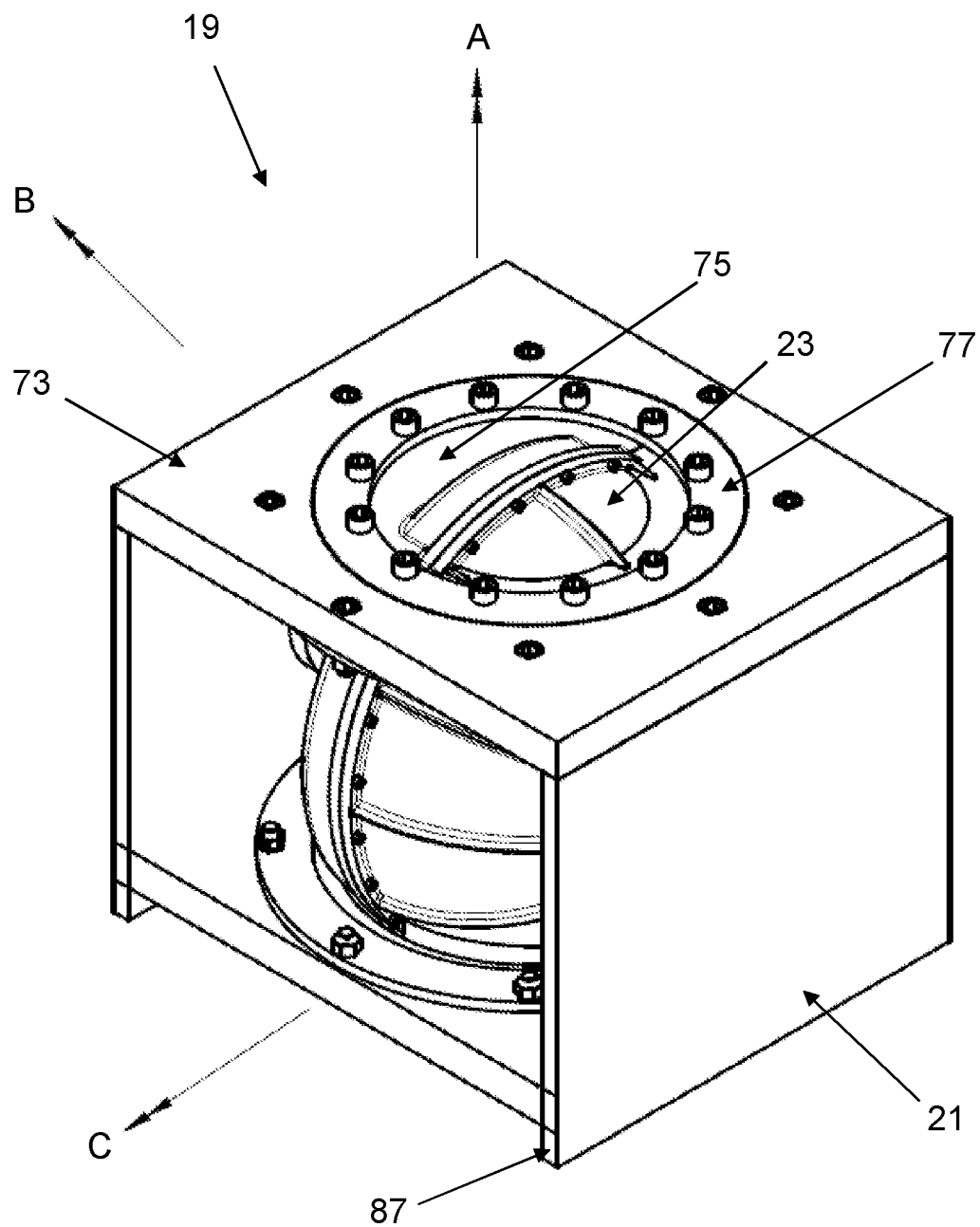
FIG. 19 is a perspective view of a gyroscopic stabiliser according to a sixth embodiment of the present invention.
Figure 20:
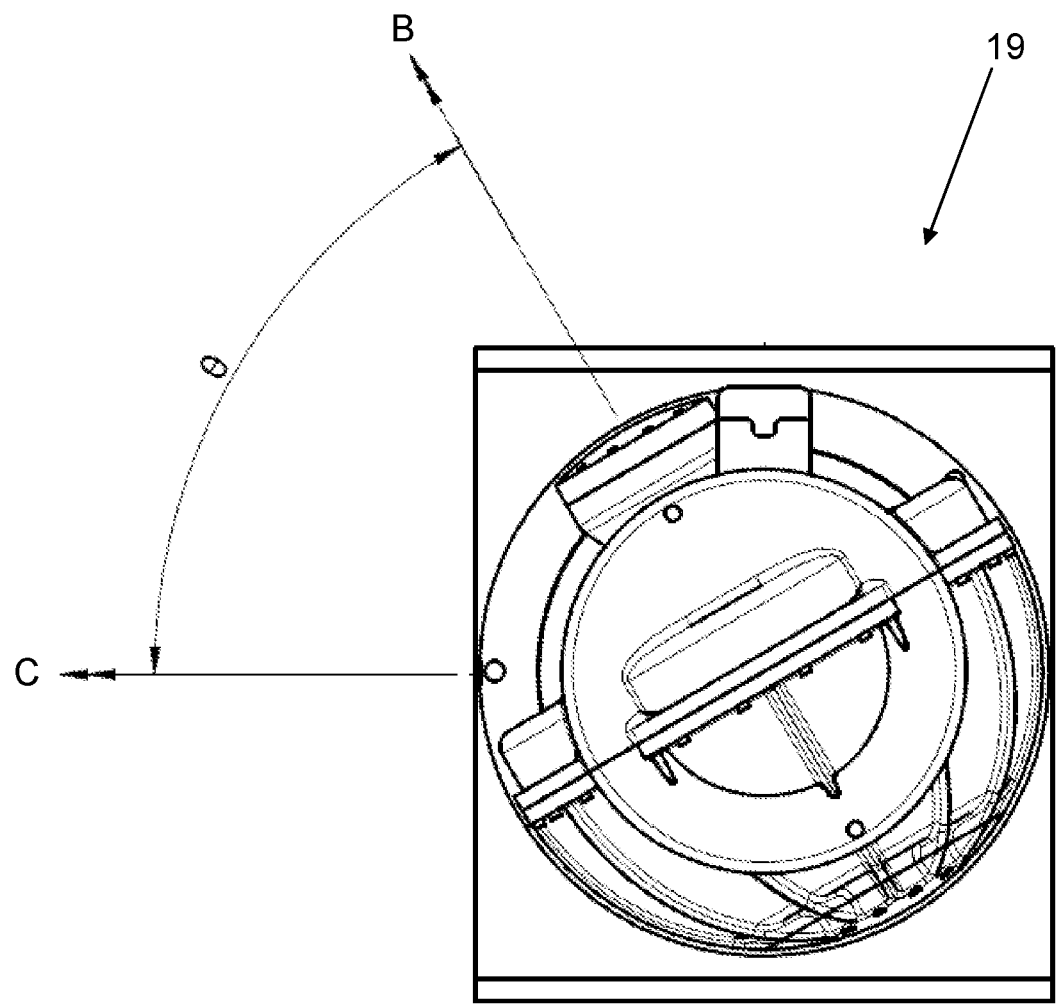
FIG. 20 is a plan view of part of the gyroscopic stabiliser according to the sixth embodiment of the present invention.
Figure 21:
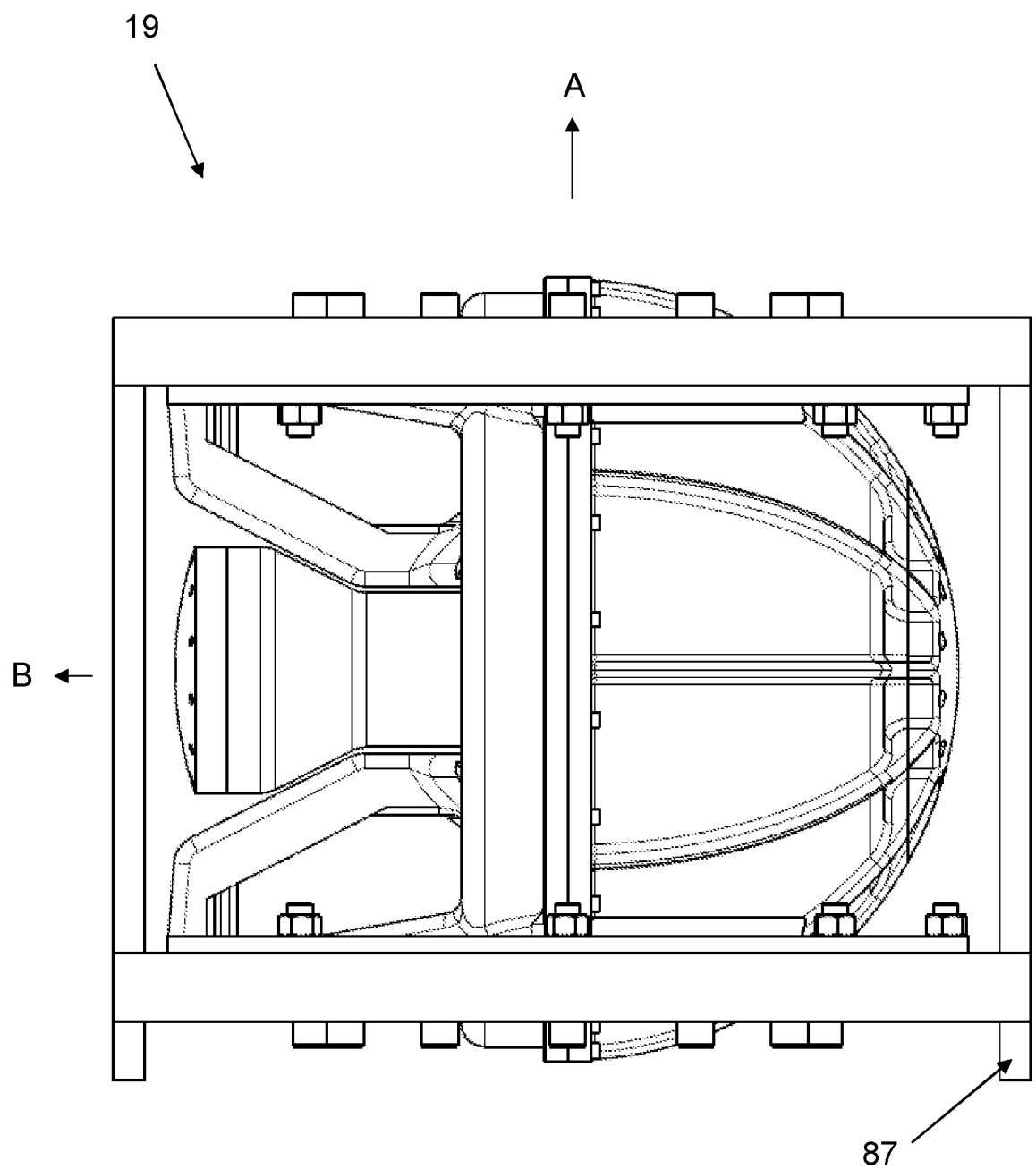
FIG. 21 is a side view of the gyroscopic stabiliser according to the sixth embodiment of the present invention.

A gyroscopic stabiliser 19 according to a sixth embodiment of the present invention is illustrated in FIGS. 19 to 21. The gyroscopic stabiliser 19 according to the sixth embodiment includes the same features as the gyroscopic stabiliser 19 of the first and fourth embodiments, some of which are indicated in FIGS. 19 to 21 using the same reference numbers. Only the differences between the gyroscopic stabiliser 19 of the sixth embodiment and the gyroscopic stabilisers 19 of the first and fourth embodiments will be described here.

The gyroscopic stabiliser 19 of the sixth embodiment differs from the gyroscopic stabiliser 19 of the fourth embodiment in that the gyroscopic stabiliser 19 of the sixth embodiment is intended to have a different orientation to the gyroscopic stabiliser 19 of the fourth embodiment when the gyroscopic stabiliser 19 is attached to an object.

In particular, as illustrated in FIGS. 19 to 21 the gyroscopic stabiliser 19 is intended to be installed with the second axis B aligned substantially horizontally and the first axis A (the precession axis) aligned substantially vertically. The gyroscopic stabiliser 19 is therefore effectively rotated 90 degrees to the left when compared to the fourth embodiment.

Therefore, in this embodiment a plane of the flywheel is parallel to the vertical axis.

The gimbal support frame 21 of the sixth embodiment is adapted to enable the gyroscopic stabiliser 19 to be installed in this orientation.

For example, the gimbal support frame 21 comprises lower legs or lips 87 for supporting the gimbal 23 above the object.

Gyroscopic stabilisers according to other embodiments of the present invention may be adapted to be fixed to an object with different orientations of the flywheel and gimbal relative to the object.

The use and operation of the gyroscopic stabiliser 19 of any of the embodiments of the present invention is the same as the conventional stabiliser 1 discussed above, so is only discussed here briefly.

In use, the gyroscopic stabiliser 19 is attached to an object whose motion is to be stabilised with the first axis A aligned with the direction in which the object experiences the motion that is to be stabilised. In the following, a marine vessel experiencing rolling in a transverse direction of the marine vessel will be described by way of example. However, the gyroscopic stabiliser of the present invention can be used to stabilise the motion of other objects, and therefore is not limited to use in a marine vessel.

When it is desired to reduce side-to-side (port to starboard) rolling of the marine vessel, the gyroscopic stabiliser 19 is attached to the marine vessel with the first axis A aligned with the transverse direction (side-to-side direction or port to starboard direction) of the marine vessel.

As discussed above, when the flywheel 33 is caused to rotate by the motor, it has an angular momentum L given in equation (1) above.

When the marine vessel experiences a rolling motion around the third axis C, for example due to a rolling torque applied to the marine vessel by waves, the marine vessel and therefore the gyroscopic stabiliser 19 experience an angular velocity $\varphi$ around the third axis C orthogonal to the first axis A. Specifically, when the first axis A is aligned with the transverse direction (side-to-side direction or port to starboard direction) of the marine vessel, the third axis C corresponds to the longitudinal direction (front-to-back direction or fore to aft direction) of the marine vessel.

Well-known gyroscopic effects mean that the rolling of the marine vessel around the third axis C, combined with the angular momentum of the flywheel 33 due to it spinning around the second axis B, causes the flywheel 33 and gimbal 23 to precess (rotate) around the first axis A with a precession rate $\psi$ and angle $\theta$. The precession rate $\psi$ depends on the roll rate of the marine vessel around the third axis C and the magnitude of the angular momentum of the flwheel 33 about the second axis B.

Figure 3:
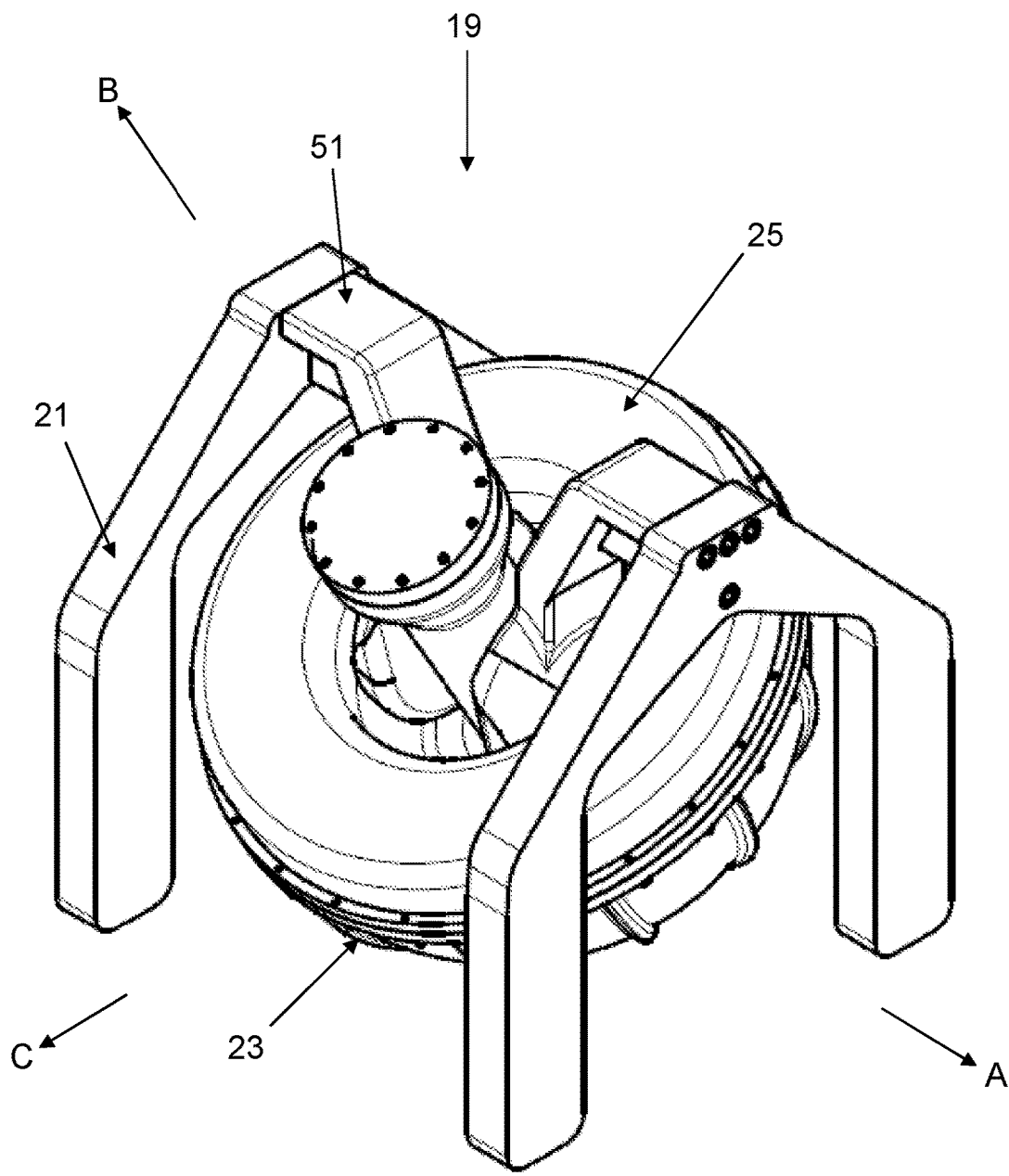
FIG. 3 is a second perspective view of the gyroscopic stabiliser according to the first embodiment of the present invention.
Figure 4:
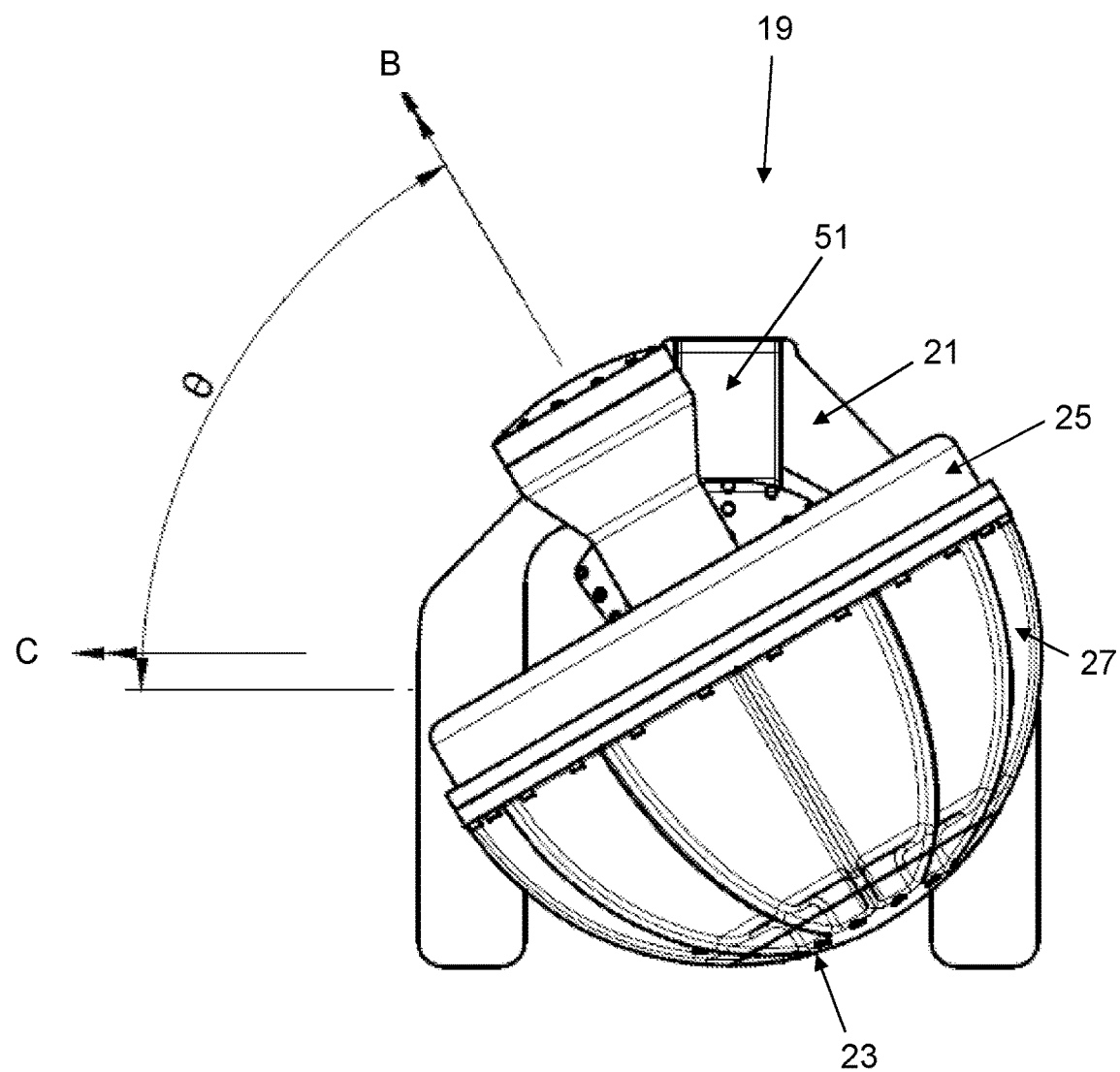
FIG. 4 is a side view of part of the gyroscopic stabiliser according to the first embodiment of the present invention.

This effect is illustrated in FIGS. 2 and 3 for example for the first embodiment. In particular, FIG. 2 shows the gyroscopic stabiliser 19 at rest, when there is no precession of the gyroscopic stabiliser 19. In contrast, FIGS. 3 and 4 show the gyroscopic stabiliser 19 when the flywheel 33 and gimbal 23 is undergoing precession (rotation) around the first axis A due to the effect of rolling of the marine vessel.

Well known gyroscopic effects mean that the precession (rotation) of the flywheel 33 and gimbal 23 around the first axis A causes a stabilising torque around the third axis C that opposes the rolling motion of the marine vessel. In particular, the stabilising torque acts in an opposite direction to the rolling torque that is causing the rolling motion. The rolling motion of the marine vessel is therefore partially suppressed, because at least some of the rolling torque is cancelled out by the stabilising torque, such that the resultant rolling torque on the marine vessel is significantly reduced.

In this manner, the gyroscopic stabiliser 19 acts to reduce the rolling motion of the marine vessel around the third axis C.

In other embodiments of the present invention, the precise manner in which flywheel 33 and flywheel shaft 35 are rotatably mounted in the gimbal 23 may be different to that described above.

Similarly, the precise manner in which the gimbal 23 is rotatably supported by the gimbal support frame 21 may be different to that described above. For example, in another embodiment the rotary damper may be omitted and the gimbal 23 may be rotatably supported by the gimbal support frame 21 by providing bearings between the gimbal 23 and the gimbal support frame 21.

When a damping mechanism is present, the damping mechanism may be different to those described above.

In some embodiments, the damper may be an active damper, in which the resistance to relative motion is adjusted electronically, for example by using an electronically controlled brake.

The damper may be similar to the damper disclosed in US2017/0370443, in which the shape of the control orifice is set such that the value of the damping coefficient increases as the angular velocity of the gimbal increases. Alternatively, the damper may provide a constant damping coefficient that does not change with angular velocity.

The damper may be a passive damper, in which the damper is not electronically controlled.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A gyroscopic stabiliser for stabilising motion of an object, the gyroscopic stabiliser comprising:
   a support for attaching to the object whose motion is to be stabilised;
   a gimbal rotatably supported by the support to be rotatable around a first axis relative to the support; and
   a flywheel rotatably supported by the gimbal to be rotatable around a second axis relative to the gimbal, the second axis being orthogonal to the first axis;
   wherein the gimbal is rotatably supported by the support at least partly within a maximum width of the gimbal along the first axis; and
   wherein a maximum width of the gyroscopic stabiliser along the first axis is equal to, or substantially equal to, the maximum width of the gimbal along the first axis.

2. The gyroscopic stabiliser according to claim 1, wherein the gimbal is rotatably supported by the support entirely within the maximum width of the gimbal along the first axis.

3. The gyroscopic stabiliser according to claim 1, wherein:
   the gimbal is rotatably supported by the support at two positions on opposite sides of the gimbal; and
   each of the two positions are at least partly within the maximum width of the gimbal along the first axis.

4. The gyroscopic stabiliser according to claim 1, wherein a maximum width of the gyroscopic stabiliser along a third axis that is orthogonal to the first axis is equal to, or substantially equal to, a maximum width of the gimbal along the third axis.

5. The gyroscopic stabiliser according to claim 1, wherein the gimbal is rotatably supported by the support at least partly within a diameter of the flywheel.

6. The gyroscopic stabiliser according to claim 1, wherein the gimbal is rotatably supported by the support by one or more bearings, and the one or more bearings are at least partly within the maximum width of the gimbal along the first axis.

7. The gyroscopic stabiliser according to claim 1, wherein:
   the flywheel is connected to a flywheel shaft that rotates together with the flywheel; and
   the gimbal is a casing or shell or housing or cage that encloses the flywheel and the flywheel shaft.

8. The gyroscopic stabiliser according to claim 7, wherein a width of the gimbal along the first axis where the gimbal encloses the flywheel shaft is less than a width of the gimbal along the first axis where the gimbal encloses the flywheel.

9. The gyroscopic stabiliser according to claim 7, wherein a shape of the gimbal substantially corresponds to a combined shape of the flywheel and the flywheel shaft.

10. The gyroscopic stabiliser according to claim 7, wherein:
    the support comprises a support portion that extends inwards from an outer portion of the support to rotatably support the gimbal inside of the outer circumference of the flywheel; and
    the support portion extends inwards from the outer portion of the support to rotatably support the gimbal where the gimbal encloses the flywheel shaft.

11. The gyroscopic stabiliser according to claim 1, wherein the support comprises a support portion that extends inwards from an outer portion of the support to rotatably support the gimbal inside of the outer circumference of the flywheel.

12. The gyroscopic stabiliser according to claim 11, wherein the support portion comprises two support arms that extend inwards from outer portions of the support on opposite sides of the gimbal to rotatably support the gimbal inside of the outer circumference of the flywheel.

13. The gyroscopic stabiliser according to claim 12, wherein:
    the gyroscopic stabiliser comprises a damping mechanism for damping rotation of the gimbal relative to the support, the damping mechanism being at least partly within the maximum width of the gimbal along the first axis; and
    each of the support arms comprises a damping mechanism for damping rotation of the gimbal relative to the support, each of the damping mechanisms being within the maximum width of the gimbal along the first axis.

14. The gyroscopic stabiliser according to claim 13, wherein each of the support arms comprises a main body of a damper.

15. The gyroscopic stabiliser according to claim 11, wherein:
    the gyroscopic stabiliser comprises a damping mechanism for damping rotation of the gimbal relative to the support, the damping mechanism being at least partly within the maximum width of the gimbal along the first axis; and
    the support portion comprises the damping mechanism.

16. The gyroscopic stabiliser according to claim 1, wherein the gimbal is rotatably supported by the support at one or more shafts that extend from the gimbal, and the one or more shafts are located inside of the outer circumference of the flywheel.

17. The gyroscopic stabiliser according to claim 1, wherein a surface of the flywheel has a non-planar shape, and the gimbal is rotatably supported by the support inside a space enclosed by the non-planar surface of the flywheel.

18. The gyroscopic stabiliser according to claim 1, wherein a surface of the flywheel is substantially cup-shaped or substantially U-shaped, and the gimbal is rotatably supported by the support inside a space enclosed by this surface of the flywheel.

19. The gyroscopic stabiliser according to claim 1, wherein the gimbal is rotatably supported by bearings positioned between the gimbal and the support.

20. The gyroscopic stabiliser according to claim 19, wherein the bearings are ring-shaped bearings that surround parts of the gimbal.

21. The gyroscopic stabiliser according to claim 20, wherein the bearings are slewing rings.

22. The gyroscopic stabiliser according to claim 20, wherein:
    the support comprises side portions at least partly within the maximum width of the gimbal along the first axis, and the side portions have openings into which the gimbal protrudes along the first axis; and
    the bearings are positioned in the openings in the side portions, and the parts of the gimbal protrude into the openings.

23. The gyroscopic stabiliser according to claim 1, wherein the support comprises side portions at least partly within the maximum width of the gimbal along the first axis, and the side portions have openings into which the gimbal protrudes along the first axis.

24. The gyroscopic stabiliser according to claim 1, wherein the gyroscopic stabiliser comprises a damping mechanism for damping rotation of the gimbal relative to the support, the damping mechanism being at least partly within the maximum width of the gimbal along the first axis.

25. The gyroscopic stabiliser according to claim 24, wherein the damping mechanism is within a diameter of the flywheel.

26. The gyroscopic stabiliser according to claim 24, wherein the damping mechanism comprises a damper coupled between the gimbal and the support.

27. The gyroscopic stabiliser according to claim 24, wherein the damping mechanism comprises a rotary damper or a linear damper.

28. The gyroscopic stabiliser according to claim 27, wherein the damping mechanism comprises a rotary damper, and the rotary damper comprises:
- a rotor coupled to the gimbal so as to rotate with the gimbal; and
- a damping chamber filled with a damping fluid;
- wherein the rotor is inside the damping chamber and arranged to rotate within the damping chamber.

29. The gyroscopic stabiliser according to claim 27, wherein the damping mechanism comprises a linear damper, a first end of the linear damper is rotatably coupled to the gimbal, and a second end of the linear damper is rotatably coupled to the support.

30. The gyroscopic stabiliser according to claim 24, wherein:
- the gimbal is rotatably supported by the support at two positions on opposite sides of the gimbal;
- each the two positions is within the maximum width of the gimbal along the first axis; and
- the gimbal is connected to a rotor of a rotary damper at each of the two positions.

31. A gyroscopic stabiliser for stabilising motion of an object, the gyroscopic stabiliser comprising:
- a support for attaching to the object whose motion is to be stabilised;
- a gimbal rotatably supported by the support to be rotatable around a first axis relative to the support;
- a flywheel rotatably supported by the gimbal to be rotatable around a second axis relative to the gimbal, the second axis being orthogonal to the first axis; and
- a damping mechanism for damping rotation of the gimbal relative to the support;
- wherein the damping mechanism is at least partly within a maximum width of the gimbal along the first axis.

* * * * *